(12) United States Patent
Pulsipher et al.

(10) Patent No.: US 7,159,217 B2
(45) Date of Patent: Jan. 2, 2007

(54) MECHANISM FOR MANAGING PARALLEL EXECUTION OF PROCESSES IN A DISTRIBUTED COMPUTING ENVIRONMENT

(75) Inventors: Darren Pulsipher, Tracy, CA (US); Nancy Hannaford, Santa Clara, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 685 days.

(21) Appl. No.: 10/247,970

(22) Filed: Sep. 19, 2002

(65) Prior Publication Data

US 2003/0120708 A1 Jun. 26, 2003

Related U.S. Application Data

(60) Provisional application No. 60/342,630, filed on Dec. 20, 2001.

(51) Int. Cl.
*G06F 9/46* (2006.01)
*G06F 15/173* (2006.01)

(52) U.S. Cl. ........................ 718/100; 709/226

(58) Field of Classification Search ................ 718/100, 718/102, 104, 106–108; 709/226
See application file for complete search history.

(56) References Cited

U.S. PATENT DOCUMENTS

| | | | |
|---|---|---|---|
| 4,825,354 A | 4/1989 | Agrawal et al. | |
| 5,319,758 A | 6/1994 | Arai et al. | |
| 5,806,076 A * | 9/1998 | Ngai et al. | 707/203 |
| 5,903,891 A | 5/1999 | Chen et al. | |
| 5,999,911 A | 12/1999 | Berg et al. | |
| 6,006,264 A | 12/1999 | Colby et al. | |
| 6,044,394 A | 3/2000 | Cadden et al. | 718/107 |
| 6,182,158 B1 | 1/2001 | Kougiouris et al. | |
| 6,247,041 B1 | 6/2001 | Krueger et al. | |
| 6,282,697 B1 | 8/2001 | Fables et al. | 717/107 |
| 6,418,484 B1 | 7/2002 | Radia | |
| 6,463,527 B1 * | 10/2002 | Vishkin | 712/245 |
| 6,574,628 B1 | 6/2003 | Kahn et al. | 707/10 |
| 6,601,057 B1 | 7/2003 | Underwood et al. | 707/1 |
| 6,606,742 B1 | 8/2003 | Orton et al. | 717/140 |
| 6,647,408 B1 | 11/2003 | Ricart et al. | 718/105 |
| 6,651,047 B1 | 11/2003 | Weschler | |
| 6,684,261 B1 | 1/2004 | Orton et al. | 709/328 |
| 6,687,735 B1 | 2/2004 | Logston et al. | 709/203 |

(Continued)

OTHER PUBLICATIONS

Richard V. Dragan, "Sun ONE Grid Engine, Enterprise Edition Software," Oct. 1, 2002, 3 pages.

(Continued)

*Primary Examiner*—Meng-Al T. An
*Assistant Examiner*—Kenneth Tang
(74) *Attorney, Agent, or Firm*—Hickman Palermo Truong & Becker LLP; John D. Henkhaus

(57) ABSTRACT

According to one aspect, a work request that specifies first and second jobs is received. The first job comprises a first task and the second job comprises a second task. The work request is processed to automatically determine whether the jobs have any dependencies that have not been satisfied. In response to a determination that the jobs have no dependencies that have not been satisfied, the jobs are caused to be executed in parallel. As a default manner of operation, the tasks included in each respective job are collectively executed in parallel, whereas tasks within a given job are not executed in parallel. In an embodiment, the tasks are executed on one or more servers of a group of networked servers.

19 Claims, 9 Drawing Sheets

U.S. PATENT DOCUMENTS

| | | | |
|---|---|---|---|
| 6,704,806 | B1 | 3/2004 | Decker |
| 6,807,572 | B1 | 10/2004 | Yu |
| 6,912,719 | B1* | 6/2005 | Elderon et al. ............. 719/319 |
| 6,996,829 | B1 | 2/2006 | Meyer ........................ 719/328 |
| 2001/0039542 | A1* | 11/2001 | Okada et al. .................. 707/3 |
| 2004/0205124 | A1 | 10/2004 | Limprecht et al. .......... 709/204 |

OTHER PUBLICATIONS

Sun Microsystems, "SUN[tm] ONE Grid Engine, Enterprise Edition," sun.com, 1994-2002, 2 pages.
Sun Microsystems, "SUN[tm] ONE Grid Engine 5.3," sun.com, 1994-2002, 2 pages.
Reg Quinton, "How to write a Makefile," date unknown, 7 pages.
Jeff Bailey, "GNU make," Dec. 25, 2002, pp. 1-201.
Platform Computing Corporation, "LSF Parallel User's Guide, Version 4.1," Third Edition, Dec. 2000, 68 pages.
Platform Computing Corporation, "LSF Programmer's Guide, Version 4.1," Fifth Edition, Dec. 2000, 156 pages.
Platform Copmuting Corporation, "LSF JobScheduler User's Guide," Fourth Edition, Jan. 2000, 149 pages.
NPi Inc., "DRM Reference Model Document, Overview—Draft V 1.0," Jul. 2001, 99 pages.
U.S. Appl. No. 09/574,334, filed May 19, 2000, entitled "Interaction Protocol for Managing Cross Company Processes Among Network-Distributed Applications", applicants: Lakshmi Ankireddipally and Ryh-Wei Yeh.
U.S. Appl. No. 09/574,335, filed May 19, 2000, entitled "Transaction Data Structure for Process Communications Among Network-Distributed Applications", applicants: Lakshmi Ankireddipally, Ryh-Wei Yeh, Dan Nichols and Ravi Devesetti.
U.S. Appl. No. 09/850,521, filed May 4, 2001, entitled "Distributed Transaction Processing System", applicants: Lakshmi Ankireddipally, Ryh-Wei Yeh, Dan Nichols and Ravi Devesetti.

* cited by examiner

MECHANISM FOR MANAGING PARALLEL EXECUTION OF PROCESSES IN A DISTRIBUTED COMPUTING ENVIRONMENT

CROSS REFERENCE TO RELATED APPLICATIONS

This application claims the benefit of priority to U.S. Provisional Patent Application No. 60/342,630 entitled "Server Farm Management Mechanism", filed Dec. 20, 2001; and is related to U.S. Pat. No. 7,117,500 entitled "Mechanism For Managing Execution Of Interdependent Aggregated Processes"; and is related to U.S. patent application Ser. No. 10/251,019 entitled "Mechanism For Managing Execution Environments For Aggregated Processes", filed on Sep. 19, 2002; and is related to U.S. Pat. No. 7,093,259 entitled "Hierarchically Structured Logging For Computer Work Processing"; the contents of all of which are incorporated by reference in their entirety for all purposes as if fully set forth herein.

FIELD OF THE INVENTION

The present invention relates generally to distributed computing and, more specifically, to a mechanism for managing execution environments for aggregated processes.

BACKGROUND OF THE INVENTION

A server farm can be defined generally as a group of networked servers or, alternatively, a networked multi-processor computing environment in which work is distributed between multiple processors. A server farm provides for more efficient processing by distributing the workload between individual components or processors of the farm and expedites execution of computing processes by utilizing the power of multiple processors. The networked servers constituent to a server farm are typically housed in a single location, however, they can be geographically dispersed such as in grid computing, which can be thought of as distributed and large-scale cluster computing and as a form of network-distributed parallel processing. Grid computing can be confined to a network of computer workstations within a company or it can be a public collaboration sometimes referred to as a form of peer-to-peer computing.

Often, a server farm environment includes many different classes of resources, machine types and architectures, operating systems, storage facilities and specialized hardware. Server farms are typically coupled with a layer of load-balancing software to perform numerous tasks, such as tracking processing demand, selecting machines on which to run a given task or process, and prioritizing and scheduling tasks for execution. Other terms used for load-balancing include load sharing and distributed resource management (DRM). In general, DRM applications are used to manage the resources associated with a server farm. One example of a commercially available distributed resource management application is Platform LSF 5 available from Platform Computing Inc.

Combining the processing power of servers into a single computing entity has been relatively common for years in the areas of research and academia. However, companies are increasingly utilizing server farms to efficiently perform the vast amount of task and service computing that they encounter in their respective businesses. For example, development of large-scale software platforms can benefit from use of networked multi-processor computing for repetitive processes associated with compiling, releasing and testing of software code.

Prior approaches to using a server farm for compute-intensive software development tasks operate by executing many small programs, or scripts, to perform numerous functions, including the following: (1) establish run-time environments for executable task commands; (2) execute task commands to perform actual work, such as compile, release and test; (3) coordinate the execution and interdependencies of various task commands (e.g., high-level processes to coordinate low-level processes); and (4) generate reports regarding the execution of the task commands. Jobs typically implement the myriad of interwoven tasks/processes that perform the work. Often, developers within a working group of a company might create scripts for performing desired functions which are specifically tailored to group-specific operations, goals, computing platforms, etc. In practice, the processes that the developers use to complete their work functions are often not written down and much of the operational set-up involves manual processes.

Additionally, different working groups within a single company, and even within a single company location, often procure, maintain and administer their respective computing environments and platforms separately and independently from other groups within the company. In such a scenario, a machine going off-line can result in having to modify many scripts that were tailored to that machine, platform, or environment. Not only does this manner of operating contribute to a waste of resources, such as unused processor capacity, but also the task of managing the large number of scripts and the computing resources on which the scripts run becomes a non-trivial, highly complex effort.

Based on the foregoing, it is clearly desirable to provide a mechanism for managing the parallel execution of processes, including interdependent processes, in a networked multi-processor computing environment. Furthermore, it is clearly desirable to provide a mechanism for managing runtime execution environments for processes executing in a multi-processor computing environment. There are more specific needs associated with the foregoing needs, which include formalizing processes with respect to executing work across multiple processors whereby the type of platform on which the work runs is transparent to a user, and for providing a common control and management layer on which users can define and run their work.

Computing platforms typically generate log files detailing various runtime and termination statistics associated with the execution of a command, task, job, process, or the like. Historically, a single log file (e.g., a "flat file") is generated for a grouping of executable tasks, jobs, etc., that are run together as a unit of work on a computer or a networked multi-processor computing environment. In the context of complex, interdependent software development tasks running together as a unit of work, the number of different tasks that perform the work can be enormous. Since runtime and termination statistics are usually generated for each executable unit of work, a corresponding log file can likewise be enormous. Consequently, such a log file is not easy to analyze and to glean information from. Analysis of a very large log file (possibly thousands of lines of text) typically requires manual parsing or filtering or the like, to find the relevant information of interest to a user. Such a manual process is not an efficient use of time and resources.

Hence, based on the foregoing, there is a clear need for a mechanism for providing log information related to processing in a more orderly and useful manner than in prior approaches. A more specific need exists for providing a logging mechanism that overcomes the shortcomings associated with prior approaches by facilitating rapidly locating information of interest.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
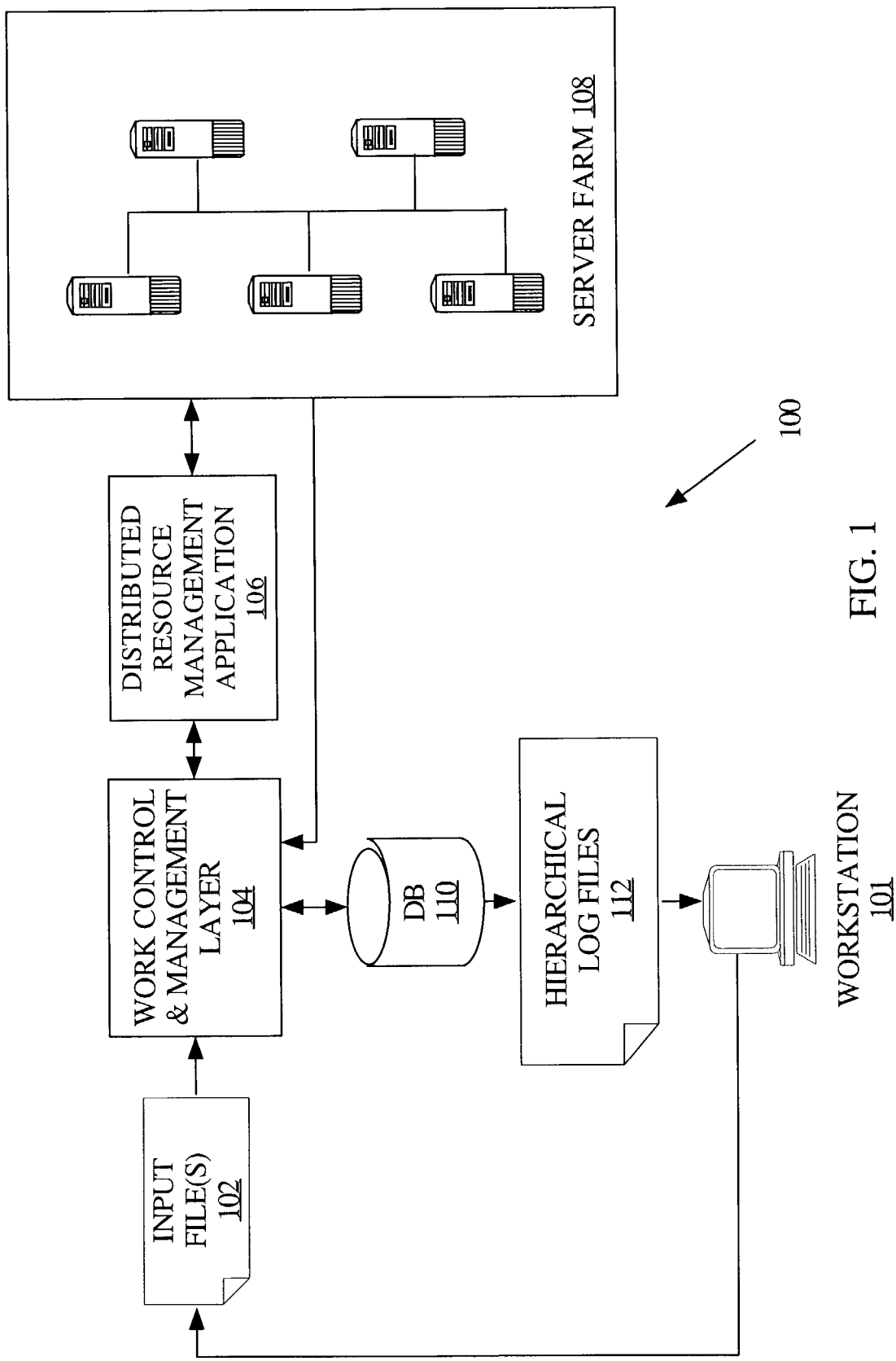
FIG. 1 is a block diagram generally illustrating an environment in which embodiments of the invention may be implemented.

A mechanism for managing execution environments for aggregated computing processes is described herein. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to one aspect, workspace definitions, which define an execution environment, can be associated with jobs. A work request is processed to automatically determine that tasks that are progeny of a given job inherit the association with the workspace definition, and therefore, that the tasks should be executed using the execution environment defined in the workspace definition. However, different execution environments can be defined for progeny of a given parent job, essentially overriding the inheritance from the parent job.

In an embodiment, the execution environment is automatically purged from the one or more computers on which it was created, after execution of the relevant tasks. Thus, computing resources associated with the environment are available for other tasks or services.

According to embodiments, causing an execution environment to be created can include, but is not limited to, causing software applications to be installed, such as a distributed resource management application; causing directories to be created for storage of information associated with execution of the task; populating directories with files; causing sets of data to be stored; and causing configuration parameters to be set, such as for hardware or software.

According to an embodiment, a set of resources associated with an execution environment is configured such that the resources are accessible by two or more computers of a group of networked computers, such as a server farm, without requiring configuring duplicate sets of the resources. Furthermore, in a server farm computing environment, an execution environment associated with one or more jobs is not reliant on being created on any given computer of the server farm.

Job Request Language

In an implementation of many of the processes disclosed herein, a Job Request (JR) language, in conjunction with a control and management layer (sometimes referred to as the "gridMatrix"), provides a common language and mechanism for managing the execution of work in a networked multiprocessor computing environment in which work is distributed among multiple processors (referred to herein as a server farm). Users of a server farm, for example without limitation, software developers who use the server farm to compile, release and test their software code, define the work that they want performed on the server farm by creating JR files.

The JR language enables users to define and automate repetitive processes, among other benefits. The gridMatrix serves the purpose of managing execution of work on a server farm by, for example without limitation, interpreting JR language work requests, instantiating distributed objects, invoking software servers to manage execution of commands, and interfacing with distributed resource management applications (possibly third party applications).

Capabilities provided by a system that employs JR language work requests with the work control and management layer (see 104 of FIG. 1) described below, include but are not limited to, the following: (1) reduced cycle times with respect to performing the work, in part due to the formalization of processes with respect to submitting large complex jobs to server farms; and (2) lower support costs with respect to the server farm resources, in part due to the common work control and management layer used to interact with a distributed resource management application (see DRM 106 of FIG. 1) that submits jobs to a server farm.

An artifact is a piece of data that is used, generated or discarded while working with a server farm. Four basic types of artifacts are utilized in the mechanisms described herein: work, jobs, tasks and workspaces.

FIG. 1 is a block diagram generally illustrating an environment 100 in which embodiments of the invention may be implemented. The environment 100 includes a workstation 101, from which a user can create and submit one or more input files 102, for example, JR files, that define a work request that specifies one or more jobs that each includes a set of one or more executable task commands. The workstation 101 is any conventional computing device, for example, the computer system 600 of FIG. 6. The input file 102 is submitted to a work control and management layer 104 (referred to at times herein as the management layer 104) for, generally, interpretation, processing, control and management of the work request and its constituent jobs and tasks, as well as installation and configuration of any resources specified in a workspace definition that may be included in the input file 102.

The work control and management layer 104, for example, the gridmatrix, which contributes to implementation of a number of the embodiments and features described herein, performs some of its functions (described below) before submitting commands and data to a distributed resource management application 106. The commands and data correspond to the work that is defined in the input file 102. Thus, the management layer 104 interprets and acts upon the input file 102 and causes the distributed resource management application to execute task commands on a server farm 108, i.e., a networked multi-processor distributed computing environment.

Furthermore, the environment 100 includes a database 110, for storing information related to many of the processes described herein. For example, in one embodiment, task commands constituent to a piece of work are essentially instantiated into computing objects (as in object-oriented programming), which are maintained persistently in the database 110, as described below. Hierarchical log files 112, described below, are also stored in the database 110 for access by workstation 101. FIG. 1 is a general illustration used for an example, however, use of the invention is not limited to use in an environment as depicted in FIG. 1. Additionally, the management layer 104 may reside on a management server (not shown) or on workstation 101. The workstation 101, database 110, and a management server, if any, may be connected to a local network for communication therebetween.

Work

Work, and constituent jobs, can be defined with one or more JR files. The work control and management layer 104 (FIG. 1) interprets JR files and "compiles" them into objects, rather than machine code. The objects can actually execute on the server farm or invoke executables to be run on the server farm. Typically, the objects are passed through a distributed resource management (DRM) application 106 (FIG. 1) that schedules and manages work to be run on the multiple processors of the server farm.

Throughout this description, the term "work" is used to describe a top-level conglomeration of functions to be performed. Work is a generic term for anything that the work control and management layer 104 can control, execute, or cause to be executed. For example, work may include many processes required to compile (sometimes referred to as "build") a software program or a portion of a software program. Work includes configuring and/or initializing any runtime environment resources, such as, for example, creating file directories and installing applications. Work also includes maintaining and applying dependencies among jobs and sub-works, which are jobs or tasks that are aggregated under a job. Work is not limited to any specific tasks or functions, but can encompass whatever a user needs to be performed or processed to attain a goal. Two general types of work are defined, which are also referred to as sub-works: jobs and tasks.

Work has states in the work control and management layer 104. Each state of work determines the behavior of the work and limits the subsequent states to which the work can transition. States can be indicated with different colors on a user interface.

Figure 2:
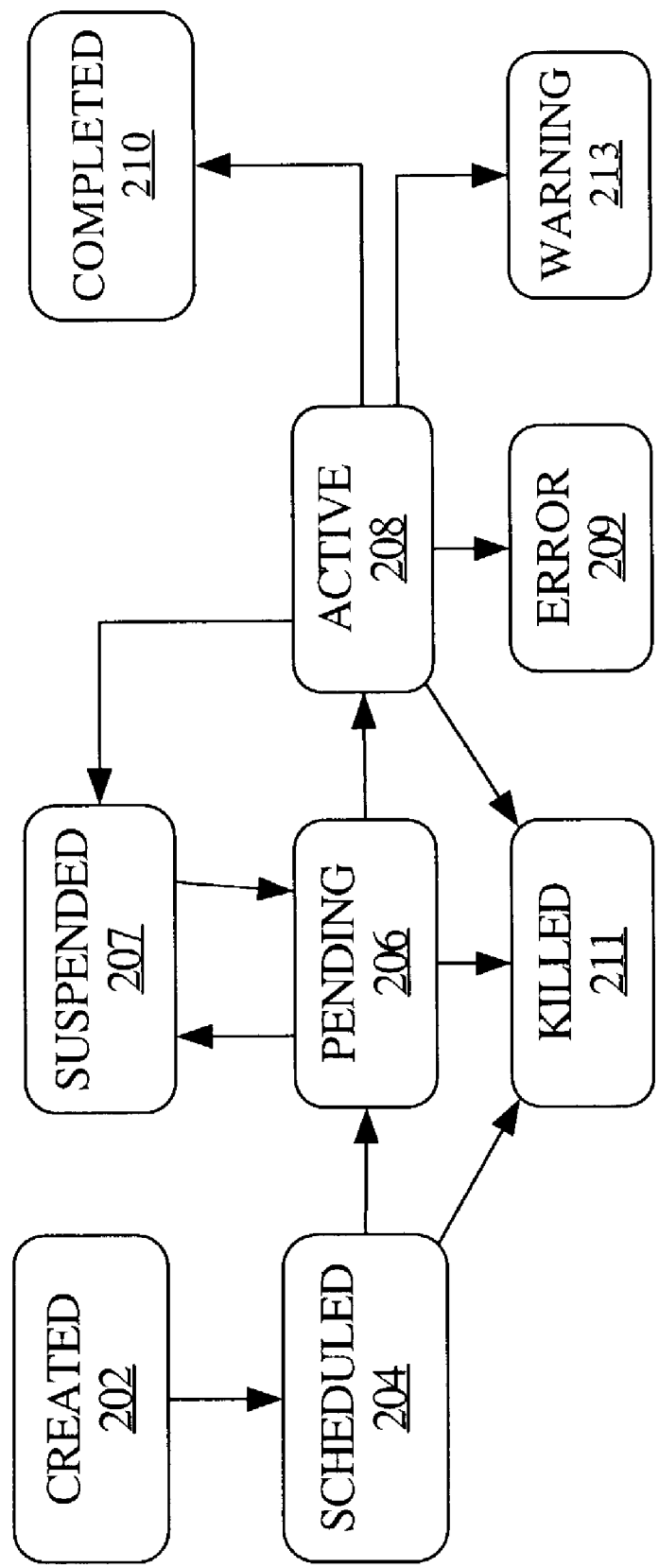
FIG. 2 is a block diagram illustrating states in which work can exist.

FIG. 2 is a block diagram illustrating states in which work can exist. When work is first created, it is in the created state 202. Created state 202 is the starting state for all work. Work moves from created state 202 to scheduled state 204 when it is scheduled for execution. For example, work is scheduled by distributed resource management application 106 (FIG. 1) for execution on server farm 108 (FIG. 1). Furthermore, if the work is a sub-work, that is, if the work has a parent artifact such as a job or sub-job, then the work may be scheduled by its parent artifact. The scheduled state 204 denotes that the work has been scheduled, but it has not yet been sent to the server farm for execution.

The pending state 206 denotes that the work has not yet met the criteria to actually execute. When work meets the criteria for executing, and thus leaving the pending state 206, work moves into the active state 208. The criteria for each type of work can vary, as described below in reference to jobs and tasks. The criteria that allow work to transition from a pending state 206 to an active state 208 may include, for example without limitation: completion of an interdependent work, job or task; termination of an interdependent work, job or task in a particular termination state; and creation of a runtime environment for the work.

Work that completes its activity without warning, error or termination, transitions from the active state 208 to the completed state 210. This state is also known as the successfully completed state. The activities for each specific type of work can vary, as described below in reference to jobs and tasks.

Work that completes execution with some warning, but no error or premature termination, transitions from the active state 208 to a warning state 213. Work that completes execution with some error, but does not terminate prematurely, transitions from the active state 208 to an error state 209. The conditions for completion of work with warnings and/or errors is specific to the type of work and, thus, can vary, as described below in reference to jobs and tasks.

Work that is terminated properly, using a command, after the created state 202 but before entering a finished state such as completed state 210, warning state 213 and error state 209, is set to the killed state 211. The actions and conditions for a killed state 211 are also specific to different types of work, as described below in reference to jobs and tasks. Finally, work can be set to a suspended state 207 when it is in the pending state 206 or the active state 208. The work can be suspended using a specific suspend command, and can be moved back into the pending state 206 using a specific resume command. The management layer 104 can then determine whether criteria have been met to move the work into an active state 208.

Jobs

A job is a type of work that can be executed, controlled and reported by the management layer 104. More specifically, a job is an aggregation of jobs (sometimes referred to as sub-jobs if they are a child of a parent job) or executable tasks, i.e., task commands.

Jobs are a fundamental mechanism for grouping work to be performed on a server farm 108 (FIG. 1). Grouping jobs and tasks improves the overall performance of distributed resource managers, such as distributed resource management application 106 (FIG. 1), and the work performed on the server farm 108. Jobs can have dependencies, on another job or a sub-job, as specified in a job definition of the work request, for example, in an input file 102 (FIG. 1). Job dependencies contribute to a determination of an order in which jobs are executed on the server farm 108, under the control of the management application 104 (FIG. 1), described in more detail below.

Jobs can have zero or more sub-works, which can be a task or another job (i.e., sub-job). Layering of jobs, akin to relating the jobs hierarchically, provides the ability to define complex, multi-leveled procedures. For example, a typical software Build and Release cycle is as follows:
1. Gather code
   A. Merge code from development branches
   B. Download appropriate tar (tape archive) files for third-party libraries for building code
2. Build product
   A. Build third part dependencies
      i. Third party tool 1
      ii. Third party tool 2
   B. Build component 1
   C. Build component 2
   D. Build component 3
3. Test product
   A. Test components
      i. Test component 1
      ii. Test component 2
      iii. Test component 3
   B. Test system integration
   C. Test system flows
      i. Run system flow test suite 1
      ii. Run system flow test suite 2
4. Package product
   A. Gather third party deliverables
   B. Gather product binaries
   C. Create installation staging area
   D. Create .tar file with installation The preceding example illustrates up to three levels of aggregation for incorporation into an associated job definition or work request. A user can submit one job with the job aggregation illustrated above included in the job definition. For example, a JR file can be constructed such that a separate job is created for each work 1-4, and a separate job is created for each sub-work of work 1-4, respectively, down through the various layers of aggregation. The job definition is submitted as a work request and typically includes a master, or root, job.

In one embodiment, all jobs defined under a work request are inherently run in parallel. That is, the default order of execution of jobs on the server farm 108 (FIG. 1) is to execute them concurrently. For example, if no dependencies between jobs are defined, then implicitly each job defined for each sub-work above would be run concurrently. However, running all jobs concurrently is not always sensible. For example, the code cannot be built until it is gathered, the code cannot be tested until it is built, and the product cannot be packaged until it is tested.

Therefore, in one embodiment, dependencies between jobs can be defined. For example, the input file 102 (e.g., a JR file) can be constructed to specify one or more dependencies among jobs in the set of jobs defined therein. Furthermore, these dependencies are interpreted by the management layer 104 (FIG. 1), and are used to manage the order of execution of the jobs and their constituent executable tasks. A job with a dependency does not execute until all of its dependencies are satisfied. A dependency may be based simply on completion of a dependent job or task, on termination of a dependent job or task, or on a specific termination state of a dependent job or task (e.g., warning state 213, error state 209, killed state 211).

In prior approaches to software programming that utilize dependencies between executable files or modules of code, execution of a second job on which a first job is dependent is typically initiated by the first job. Thus, each instance that the first job is encountered during processing of the work triggers execution of the first job's dependents, that is, the second job in this example. In the meantime, the first job is sitting idle waiting for termination of the second job, all the while using system resources.

According to an embodiment of the invention, the first job does not trigger execution of the second job, on which the first job is dependent. Significantly, the second job is triggered by the normal operation of the management layer 104 (FIG. 1), which sends jobs to the DRM application 106 (FIG. 1) according to the work structure specified in the work request, with respect to both the job aggregation structure and the structure of dependencies between jobs. Upon interpretation of a work request, the management layer 104 establishes a data observer relationship between the second and second jobs, whereby the second job (as a "publisher") is directed to announce its termination state to the first job (as an "observer"), and to any other jobs that depend on the second job. Thus, the first job does not become active until the second job notifies it that it has finished executing, that is, that the tasks and sub-works of the second job have finished executing. Consequently, the first job does not initiate and then sit idle, wasting resources of the server farm 108 (FIG. 1).

Additional beneficial consequences derive from the communication between interdependent jobs described above. For example, the embodiment described provides the ability to have a first job be conditionally dependent on a second job or on a third job, via a conditional OR dependency. Consequently, complex and alternative process flows can be defined. In addition, the second and third jobs do not both have to be initiated by the first job, whereby the first job would then wait for one of the second and third jobs to finish in the proper state, thereby unnecessarily using resources, as in prior approaches. Contrarily, in this embodiment, global resources are conserved for the following reasons. First, the first job does not initiate just to initiate the dependent jobs and then to sit idle. In fact, the first job may never initiate, and thus be cancelled, because the second and third jobs may never terminate with the proper state. Second, either one of the second and third jobs, for example the second job, is never run at all because the other job, i.e., the third job, finishes with the proper termination state on which the first job depends, before the second job is ever submitted for execution. The significance of this feature grows with multiple levels of dependencies between jobs and sub-jobs throughout the job aggregation structure.

In an embodiment, a dependency between two jobs can be specified to resolution via a logical expression, where the logical expression has as operands the statuses of one or more other jobs. At a further point in the process, the logical expression is resolved using the statuses of the other jobs to determine whether the dependency is met. When the dependency is met, the dependent job is placed in an active state and its sub-works scheduled for execution. In related embodiments, the logical expression is an "OR" operation and is an "AND" operation.

According to one embodiment, jobs are not passed to the distributed resource management application 106 (FIG. 1) until all of its dependencies are met. Consequently, the DRM application 106 queue is reduced and a given job gets dispatched to the server farm 108 (FIG. 1) quicker and more efficiently. That is, the DRM application 106 is not now, as in the past, sending jobs to the server farm 108 to "sleep", where they reside in one or more queues awaiting completion of a job or jobs on which they depend. Furthermore, since resource utilization measurements associated with some DRM applications 106 are based on the number of processes being managed and processed instead of CPU utilization, utilization of resources associated with operation of the DRM application 106 are minimized through implementation of this embodiment.

Aggregation of jobs facilitates the propagation of workspaces (described below) and variables from parent jobs to their progeny jobs, as well as the propagation of statistics and states (described below) from progeny tasks and jobs to their ancestor jobs. An example of statistics that can propagate through the job aggregation structure includes task runtime statistics such as CPU time, memory usage, DRM queue utilization, disk space used, and disk I/O operations. Such statistics provide valuable information with respect to planning and managing resources associated with a server farm.

The state diagram of FIG. 2 is applicable to jobs as well as to work, with additional commentary to follow.

In one embodiment, all jobs begin in the created state 202, which is the same as the standard work created state. A job is moved to the scheduled state 204 from the created state 202 when the parent job schedules the job. If the given job is the master (i.e., top-level) job, then it is scheduled by the management layer 104 (FIG. 1) when the job is submitted to the server farm 108 (FIG. 1) to be run.

A job is moved to a pending state 206 from the scheduled state 204 when the parent job executes the job. All jobs pass through the pending state 206 at some point before actually performing work. Furthermore, a job remains in a pending state 206 until all of its dependencies have been satisfied. A job can move to a pending state 206 from a suspended state 207 when a user issues a resume command.

A job is moved to an active state 208 from the pending state 206 when all of the dependencies of the job are satisfied. In one embodiment, when a job finishes it sends a message to the job or jobs that depend on it. This message indicates whether the job reached the completed state 210 or some other non-completed, termination state (e.g., warning state 213, error state 209, killed state 211). Once a dependent job receives a message from a job on which it is dependent, the management layer 104 checks the dependency criteria for all of the jobs on which the dependent job is dependent. If all of the dependency criteria are satisfied, then the dependent job can move into the active state 208.

When a job is moved to the active state 208, all of its sub-works are moved to the scheduled state 204. Similarly, sub-works of a given job do not get scheduled, i.e., move to a scheduled state 204, until their parent jobs are in the active state 208. The management layer 104 (FIG. 1) will then cause the execution of all of the sub-works of the job, thus moving the sub-works into an active state 208. The propagation of state continues, which can be envisioned as continuing out to the leaf nodes of a hierarchical job aggregation tree.

A job is moved to a completed state 210 from an active state 208 when all of its sub-works have been moved to a completed state 210. In one embodiment, when a sub-work finishes executing, it notifies its parent job that it has finished. Then, the parent job checks the status of all of its sub-works to determine whether all of the sub-works are in the completed state 210. If all pertinent sub-works are in the completed state 210, then and only then, will the parent job also move to the completed state 210. After the parent job is moved to the completed state 210, it notifies its parent, if any, that it has finished. Hence, not only is state (e.g., the active state 208) propagated down the aggregated job structure from parent jobs to progeny jobs (i.e., sub-works), but state (e.g., the completed state 210) is also propagated up the aggregated job structure from sub-works to parent jobs (i.e., ancestors).

A job is moved to the warning state 213 or the error state 209 from the active state 208 when, and only when, all of its sub-works are in a finished state, such as completed state 210, warning state 213 and error state 209, with one or more sub-works being in the warning state 213 or error state 209, respectively. Once a job is set to the warning state 213 or the error state 209, it notifies its parent job, if any, that it has finished, which propagates up the aggregated job structure to the master job.

A job transitions from a previous non-finished state to the killed state 211 upon issuance of a specific kill command. A user can specify any job or task when killing a job. Once a job is moved to the killed state 211, it sets the state of all of its sub-works that are not finished to the killed state 211. Hence, the killed state 211 is propagated down the aggregated job structure to the leaf nodes. Furthermore, the killed state 211 propagates up the aggregated job structure toward the master job, similar to the other finished states (i.e., completed state 210, error state 209 and warning state 213). After a job moves its sub-works to the killed state 211, it notifies its parent that it has finished. The parent job will only change its own state to the killed state 211 when all of its children are in a finished state or killed state 211.

A job transitions from the pending state 206 or the active state 208 to the suspended state 207 upon issuance of a specific suspend command. The suspended job sets the state of all of its sub-works to the suspended state 207 if they are in the pending state 206 or active state 208. The suspended state 207 is propagated down the aggregated job structure to the leaf nodes, setting all of the pertinent sub-works to a suspended state 207. A specific resume command can be issued to move a job from a suspended state 207 to a pending state 206. Each sub-work of the resumed job is set to the pending state 206, not the active state 208, if the sub-work was in a suspended state 207. The work control and management layer 104 (FIG. 1) verifies whether, and when, the sub-works can be moved to the active state 208.

Figure 3:
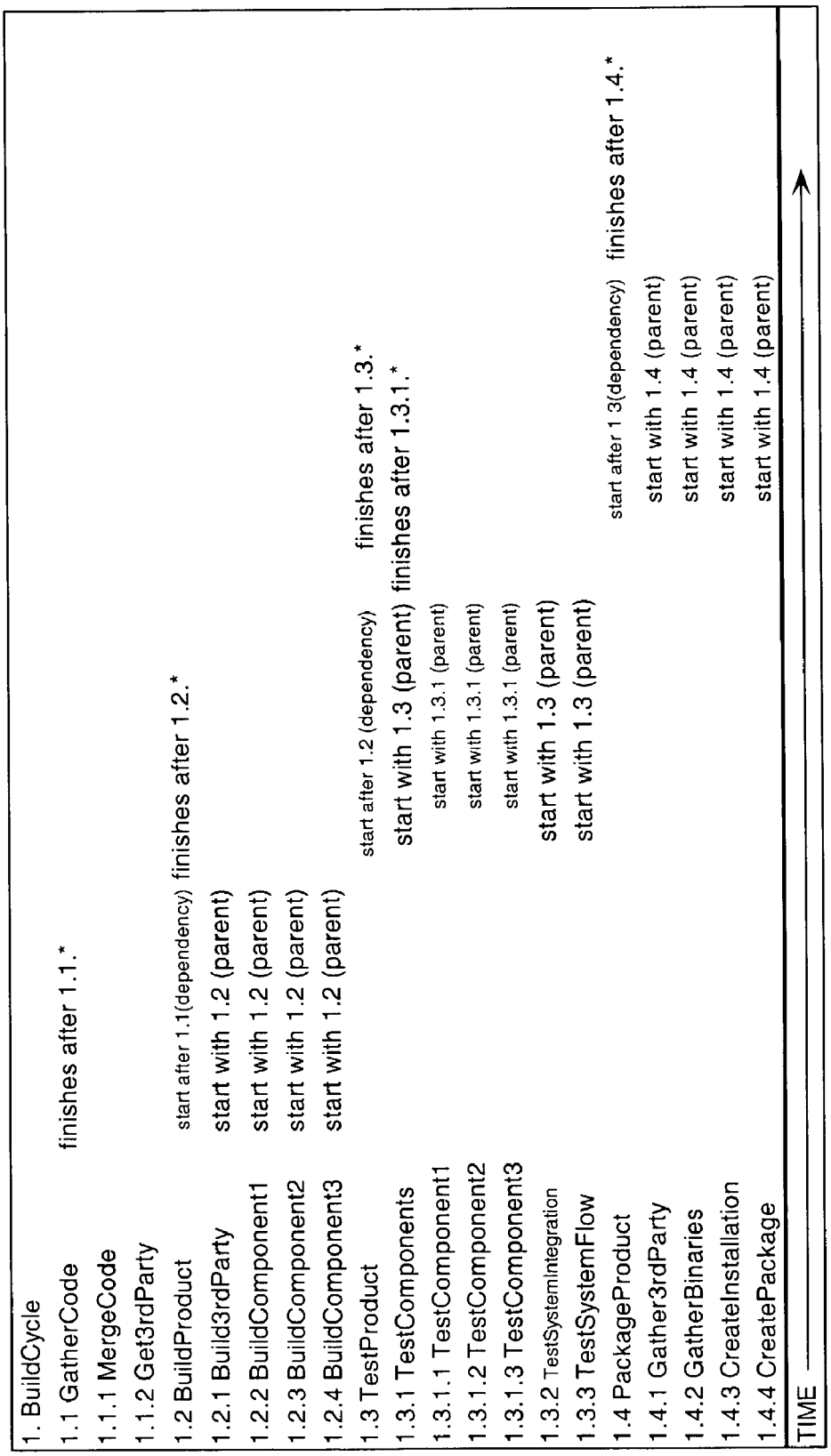
FIG. 3 is a diagram graphically illustrating the timing of events with respect to a typical software Build and Release cycle.

FIG. 3 is a diagram graphically illustrating the timing of events with respect to the typical software Build and Release cycle presented above. As depicted in FIG. 3, jobs aggregated or grouped under a given job (for example, 1.3.1.1, 1.3.1.2 and 1.3.1.3 being aggregated under 1.3.1, and 1.3.1, 1.3.2 and 1.3.3 being aggregated under 1.3) are essentially started when their parent job starts, possibly with a slight delay for processing, and are executed concurrently. Furthermore, a job with a dependency on another job (for example, 1.2 BuildProduct is dependent on 1.1 GatherCode, and 1.4 PackageProduct is dependent on 1.3 TestProduct) does not start until its interdependent job finishes. Thus, 1.2 starts after 1.1 finishes, 1.3 starts after 1.2 finishes, and 1.4 starts after 1.3 finishes.

In addition to the states depicted in FIG. 2, jobs can also be in a cancelled state. A job is moved to a cancelled state from the pending state 206 when a dependency condition fails to be met. A dependency condition fails when a respective interdependent job moves to one of the terminal states and does not meet the status, or dependency criteria, associated with the respective dependency and specified in a status condition statement of a work request. For example, a Job A may be dependent on a Job B terminating in a warning state. If Job B terminates in an error state instead of the warning state, the dependency criterion is not met. Hence, Job A is moved to a cancelled state.

The functionality of the work control and management layer 104 provides and enforces structure upon the states and execution of jobs and their constituent tasks. To that end, certain constraints and/or rules are inherent to various embodiments. For example, (1) sub-works do not get scheduled until their respective parent job is in an active state; (2) all jobs pass through a pending state before moving to an active state; (3) a job with a dependency is maintained in the pending state until its dependent jobs reach the completed state; and (4) jobs do not reach the completed state until all of their children jobs (i.e., sub-jobs) are in the completed state.

Tasks

A task is an atomic unit of work that is performed on a server farm. That is, a task is an executable command that is executed on one or more processors of a networked multi-processor computing environment. In one implementation, a task is represented as an attribute in a task object. Tasks are grouped together to form jobs, and tasks within a job are run sequentially. The results of a task are maintained in a log file according to a job hierarchy specified in an input file such as input file 102 (FIG. 1), and are accessible via a network-based interface, such as an HTML page. Details of the logging function of the work control and management layer 104 (FIG. 1) are described in more detail below. Like a job, a task is a type of work, which has states. Tasks are represented in a job definition, for example, in a JR file, similarly to how jobs are represented.

The JR language provides the capability of defining jobs once and passing parameters to the job definitions, which are instantiated as job objects. The parameters are used to create commands that represent tasks that execute on a server farm. The commands that actually execute on the server farm are defined by name, with arguments passed in. Not only are executable task commands declared in a work request, but required directories, configuration management systems, and other environmental information are also specified in the work request. A concept of "workspaces" is used to refer to the specification and establishment of the directories, etc., that a task needs to execute. More details about workspaces are provided below.

Tasks constituent to a given job are inherently run in a sequential order, as a default order of execution. On the other hand, jobs are inherently run in parallel. In one embodiment, a task of a given job does not start executing until all previous sub-works of the given job are completed. In this context, "previous" refers to a sub-work occurring in an input file sequentially before another sub-work. If a previous sub-work is a task, then the given task will not start executing until the previous task finishes. If a previous sub-work is a job, then the given task will not start executing until all previous jobs of the given job are finished.

A user can group a number of tasks together in a job by defining the tasks sequentially in a work request, i.e., a JR or other input file 102 (FIG. 1). Tasks grouped together in a job are inherently run in a sequential order, but are submitted to a distributed resource management application 106 (FIG. 1) as a single job. Therefore, processing overhead associated with preparation and submission of a job to the server farm 108 (FIG. 1) by the distributed resource management application 106 is reduced in comparison with submitting each grouped task independently. Hence, resource usage of server farm 108 is optimized and the work is performed faster.

The state diagram of FIG. 2 is applicable to tasks as well as to jobs and work. The states of tasks are equivalent to the states described in reference to jobs, unless otherwise indicated in additional commentary below.

A task is moved to the scheduled state 204 from the created state 202 when its parent job reaches the active state 208. Only jobs in the scheduled state 204 can move to the pending state 206. A task is moved to the pending state 206 from the scheduled state 204 when the task is submitted to a distributed resource management application 104 (FIG. 1). The task remains in the pending state 206 until the task actually starts executing on the server farm 108 (FIG. 1). The longer a task spends in the pending state 206, the longer it remains in a queue of the distributed resource management application 104, waiting to be distributed to a host machine of server farm 108. If queue time is longer than desired, the queue definition can be adjusted and/or additional resources can be allocated.

As stated, a task transitions to the active state 208 from the pending state 206 when the task actually starts executing on a host machine of server farm 108. At this point in the process, an associated task object has additional information stored in its properties to identify the host machine on which it is running and to identify an associated distributed resource manager.

A task transitions to the completed state 210 from the active state 208 when the corresponding task command finishes executing and exits with a successful termination status. Once a task is moved to the completed state 210, it propagates its state up the job aggregation structure, indicating that it has completed executing. As described, a parent job will only change its own state to the completed state 210 when all of its children sub-works reach the completed state 210.

A task transitions to an error state 209 from the active state 208 when the corresponding task command finishes executing and exits with a failure. Once a task is moved to the error state 209, it propagates its state up the job aggregation structure, indicating that it has finished executing but failed.

A task transitions from a previous non-finished state to the killed state 211 upon issuance of a specific kill command. Once a task is moved to the killed state 211, it stops all processes and sub-processes associated with the executing command. The killed state 211 is propagated down the aggregated job structure and up the aggregated job structure. After a task kills its processes, it notifies its parent that it has finished. The parent job will only change its own state to the killed state 211 when all of its children are in a finished state or killed state 211. In addition, if a task reaches the suspended state 207, the management layer 104 (FIG. 1) suspends all processes for the command corresponding to the task. Furthermore, the management layer 104 sets a termination or exit status (e.g., completed, warning, or error) of a task when its corresponding task command finishes executing.

Workspaces

Tasks are typically executed in some execution or surrounding runtime environment. The environment can include, for example without limitation, variables, configuration parameters, applications, a directory hierarchy, data files in a directory hierarchy, and a working directory.

In one aspect of the invention, a user can define the execution environment with a concept referred to as workspace or workspace definition. Workspaces typically include resources and an associated configuration that get initialized prior to runtime. Workspaces that are defined in a work request are inherited throughout the aggregated job structure. In other words, a workspace defined for a given job is also used for the given job's progeny jobs, unless otherwise indicated. However, a different workspace can be defined in the work request and utilized for progeny jobs of a given job.

Furthermore, a workspace can be created with no knowledge or dependency on the configuration of the server farm 108 (FIG. 1). This is in contrast with prior approaches to constructing environments in which to execute tasks, whereby, typically, scripts are run to construct the required runtime environment and the scripts are customized to a particular computing system, platform, configuration, etc. That is, prior approaches do not provide a global construct such as the workspace construct described herein, whereby runtime resources are configured and made available to multiple processes and multiple processors in a networked multi-processor computing environment. Also, multiple tasks can execute in a given workspace at the same time.

Workspace creation is controlled and monitored by the management layer 104 (FIG. 1). For each workspace definition in the work request (e.g., an input file 102, such as a JR file), a task is created and associated with the appropriate job for which the workspace is defined. Since workspace creation is a task, it has the attributes and follows the constraints described above for tasks, such as state and aggregation and dependency timing. Furthermore, after execution of the tasks within a given workspace, the resources associated with the given workspace are automatically deconfigured, or purged. That is, the resources are freed up for use by other jobs.

A user may want to define a customized workspace if, for example without limitation, any of the following requirements are present: (1) a software application needs to be installed prior to task command execution; (2) multiple jobs consist of or rely on the same pre-execution tasks; (3) a configuration management system that requires unique set-up operations is used; and (4) a complex execution environment is required.

Customized workspaces define what actions to take to construct an execution environment, often relative to each of multiple computing platforms. In an embodiment, a workspace definition includes a reference to an object class, which comprises functionality that is invoked to create an associated execution environment on one or more computers. Once instantiated, workspace objects are centrally and persistently stored, such as in the database 110 (FIG. 1), and made available to all of the server machines within the server farm 108 (FIG. 1). Additionally, workspaces can be archived, they can be made to automatically destruct or deconfigure, and they can be accessed through a network interface. For example, a user can access the workspace (and other objects and software servers) through a network such as a LAN.

A concept of variables can be utilized to define tokens that can be reused throughout a given job definition or work request, for various jobs. Furthermore, variables are inherited from parent jobs to associated sub-jobs. A workspace is a type of variable. A variable may have the same value throughout execution of the relevant jobs, that is, the values of variables can be passed from a parent job to its progeny. Alternatively, the value can be modified with respect to various sub-jobs. That is, a sub-job can override a variable value that was defined in its parent job.

Persistent Distributed Object Architecture

The framework provided by the job request language in conjunction with the work control and management layer 104 (FIG. 1) benefits from a mixed-platform inter-process communication methodology for running multiple jobs on a server farm and reporting the status of jobs to a central location. The status of the processes and jobs running on a server farm needs to be fault tolerant so that complex job definitions can be restarted if hardware fails. Hence, according to one aspect, a persistent distributed object architecture is used to satisfy the need for fault tolerance.

The persistent distributed object architecture provides a platform-independent solution which decreases the complexity of an implementation of the system and methods described herein. Since the state of the objects which represent the processes running on a server farm are critical, the state of the objects in this framework are persistent, that is, they are stored in a non-volatile medium. Since process architecture within a server farm can change dependent on the size and type of server farm being employed, the inter-process communication utilized by the persistent distributed object architecture is independent of the process architecture of a given server farm.

According to one embodiment, the Perl language is used to implement the persistent distributed object architecture. Since the objects are implemented in a distributed manner, the ability to communicate between objects that are not in the same execution process is provided by CORBA (Common Object Request Broker), according to one embodiment. CORBA essentially provides a software object bus for the inter-communication between objects underlying the system.

Furthermore, in one embodiment, each object section is stored separately. That is, attributes, properties, variables and statistics are stored as files that contain a list of name-value pairs. The relationships between objects, such as the job aggregation relationships and the dependency relationships, are stored differently than the foregoing sections. Files are used to describe the relationships for respective objects, which contain a list of strings or EOIDs (Extended Object Identifier) that represent the relationships of a given object with one or more other objects. Each EOID uniquely identifies an object in the database. Thus, the persistent distributed object architecture can return an EOID for any object in memory and, likewise, and can create an object containing all of the object data, given an EOID.

The persistent distributed object architecture uses a persistent object locator (POL) to readily locate objects, so that if a link between the work control and management layer 104 (FIG. 1) or a job server 804 (FIG. 8) and the server farm 108 (FIG. 1) fails, a task can continue to execute on the server farm 108. When each job server 804 or task server 806 (FIG. 8) initializes, it registers with the POL. Consequently, the POL is aware of every job and of the location of the associated objects. Thus, after a system failure, using the persistent object locator, a task server object such as task server 806 can read the database 110 (FIG. 1), reinstantiate pertinent objects (including a job server 804 object), and continue executing.

Processes for Managing Execution of Computing processes on a Server Farm

Figure 4:
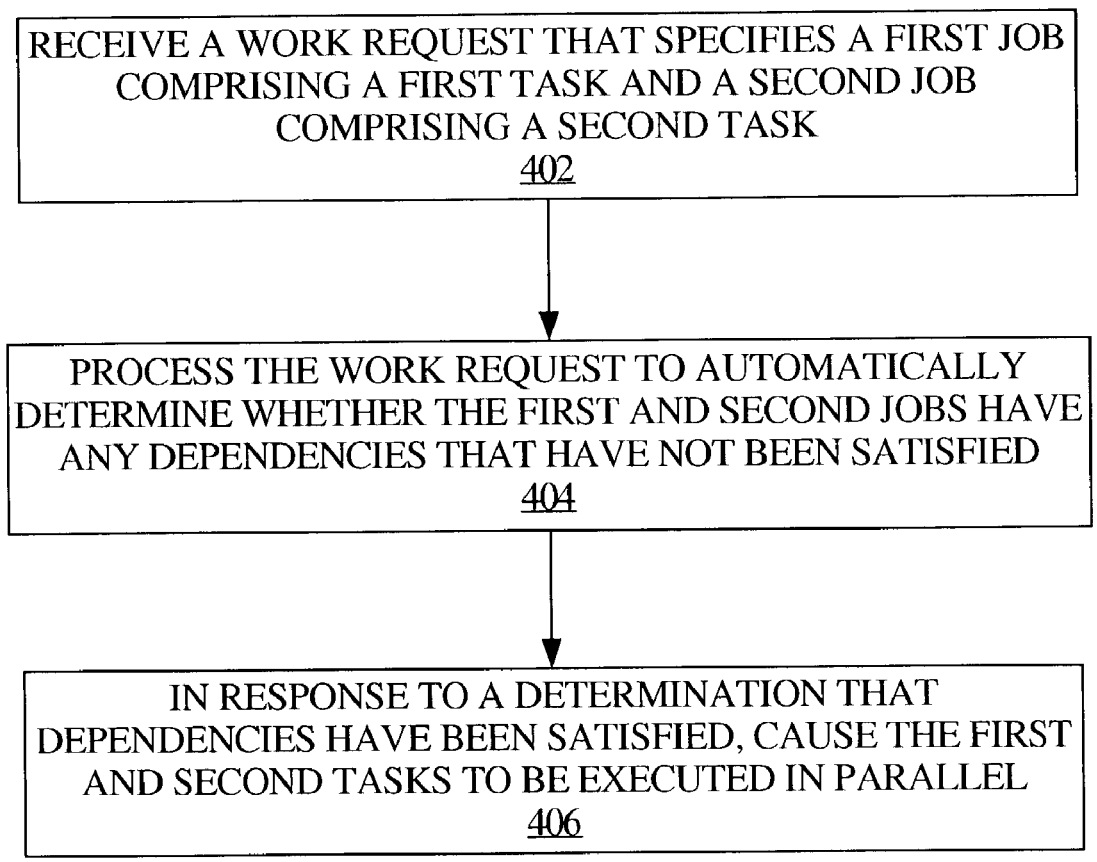
FIG. 4 is a flowchart illustrating a first process for managing execution of work.

FIG. 4 is a flowchart illustrating a first process for managing execution of work.

At block 402, a work request is received that specifies a first job comprising a first task and a second job comprising a second task. Each task is an executable task command. For example, work control and management layer 104 (FIG. 1) receives a work request via one or more input files 102 (FIG. 1), such as a JR file, and parses it. The management layer 104 interprets the input file 102 to determine an order of execution of the jobs constituent to the work request and the associated sets of tasks associated with each of the jobs, in accordance with the foregoing teachings. Conventional parsing can be used.

At block 404, the work request is processed to automatically determine whether the first and second jobs have any dependencies that have not been satisfied. In response to a determination that the first and second jobs have no dependencies that have not been satisfied, at block 406 the first and second tasks are caused to be executed in parallel. For example, the tasks are sent to a networked multi-processor computing environment, e.g., a server farm 108 (FIG. 1), for execution on one or more processors of the computing environment.

Significantly, the work request does not explicitly specify that the first and second tasks are to be executed in parallel. Hence the default work execution order is to run jobs in parallel, that is, to run the tasks constituent to jobs, in parallel. Since each job is run in parallel unless otherwise specified in the work request, the respective set of task commands included in each respective job are collectively executed in parallel with each other. For example, tasks 1–4 of a first job are submitted to a distributed resource management application 106 (FIG. 1) to be executed on a server farm 108 (FIG. 1) in parallel with tasks 1–10 of a second job. Parallel processing of as much of the work as possible, or feasible, provides for efficient use of computational resources and for faster job processing.

Furthermore, the respective task commands of a set of task commands are substantially serially executed on one or more networked processors of the computing environment. That is, the respective task commands of a set of task commands are not run in parallel. For example, tasks 1–4 of a first job are executed serially. That is, each of tasks 1–4 is run one after another.

If the work request that is received at block 402 specifies that the first and second jobs are to be serially executed, then they are caused to be serially executed on one or more networked processors of the computing environment. Thus, the set of task commands included in one of the first and second jobs is executed after the set of task commands included in the other of the first and second jobs is executed. For example, tasks 1–4 of a first job are submitted to a distributed resource management application 106 (FIG. 1) to be executed on a server farm 108 (FIG. 1) after tasks 1–10 of a second job finish executing.

In an embodiment, both the first and second jobs are placed in an active 208 (FIG. 2) state, and the first and second tasks are caused to be executed after the first and second jobs, respectively, are placed in the active state. In a related embodiment, the first task has a parent-child relationship with the first job and the second task has a parent-child relationship with the second job. That is, the first task is a child of the first job and the second task is a child of the second job, according to a job aggregation schema specified in the work request.

In an embodiment, the first job further comprises a third task, which is caused to be executed after execution of the first task. In a related embodiment, the first and third tasks are children of the first job, thus, they are executed in sequence rather than in parallel.

In one embodiment, a job can include one or more sub-jobs that include executable task commands. Furthermore, if a job is defined to include two or more sub-jobs, then the two or more sub-jobs are caused to be executed in parallel. As such, respective sets of task commands included in respective sub-jobs of the two or more sub-jobs are executed in parallel. For example, tasks 1–4 of a first sub-job of a first job are submitted to a distributed resource management application 106 (FIG. 1) to be executed on a server farm 108 (FIG. 1) in parallel with tasks 1–10 of a second sub-job of the first job. As with jobs, the respective task commands included in a respective sub-job are serially executed on one or more processors of the computing environment.

Note that the sub-jobs of a given job are inherently run in parallel, and the given job is also inherently run in parallel with other jobs specified in the work request. Hence, sub-jobs of a first job can run in parallel with a second job as long as the first and second jobs do not depend on each other, where the sub-jobs and the second job are at different levels of the aggregated job structure defined in the work request. Again, advantages are obtained by running as much of the work, be it jobs or sub-jobs, in parallel as possible within the inherent structure of the work, as defined in the work request.

In an embodiment, the work request is interpreted and processed and upon termination of execution of the task commands included in the job, the termination state of the job is set based on the interpreted work request. For example, if a user wants to establish that a job that runs for more than thirty seconds should terminate executing with an error state 209 (FIG. 2), this can be specified in the work request. The work control and management layer 104 (FIG. 1) will perform accordingly by setting the termination state of a job running over thirty seconds to the specified error state 209.

One benefit of the preceding feature is that job dependencies that are conditional on the termination state of one or more other jobs can be built into a work request. For example, a user could specify that if job 1 terminates with a completed status 210 (FIG. 2), then run job 2; but if job 1 terminates with a warning status 213, then run job 3. In that scenario, only one of jobs 2 and 3 actually executes, and which job executes depends on the termination state of job 1. Thus, conditional dependencies provide a mechanism to define alternative process flows to perform the desired work. Furthermore, as previously described, one embodiment provides the ability to have a first job be conditionally dependent on a second job or on a third job, via a conditional OR dependency.

In one embodiment in which a work request includes a sequential set of executable task commands that are not explicitly structured as a job, instructions are submitted to a distributed resource management application (e.g., application 106 of FIG. 1) specifying that the sequential set of commands are to execute as a job. That is, the sequential set of task commands are specified to be serially executed on one or more networked processors of the computing environment. Submitting a group of commands to a server farm 108 (FIG. 1) as a single job, i.e., with a single submission to the server farm 108, helps to minimize the queuing, control and management burden associated with job scheduling that is typically associated with the distributed resource management application 104. For example, each of ten tasks may take five seconds to run but twenty seconds to independently process, queue and submit to the server farm 108. Thus, submitting the group of ten tasks as a single job, where the job takes fifty seconds to run but still only twenty seconds to process, queue and submit, conserves computational resources and finishes sooner.

The foregoing processes represent, generally, a method for managing execution of work. Although process steps are described in a particular order in FIG. 4, embodiments of the invention are not necessarily limited to any particular order of carrying out such steps, nor are embodiments necessarily limited to carrying out every step described. Thus, implementation of the principles, techniques and mechanisms described herein may vary considerably and still fall within the scope of the invention.

Figure 5:
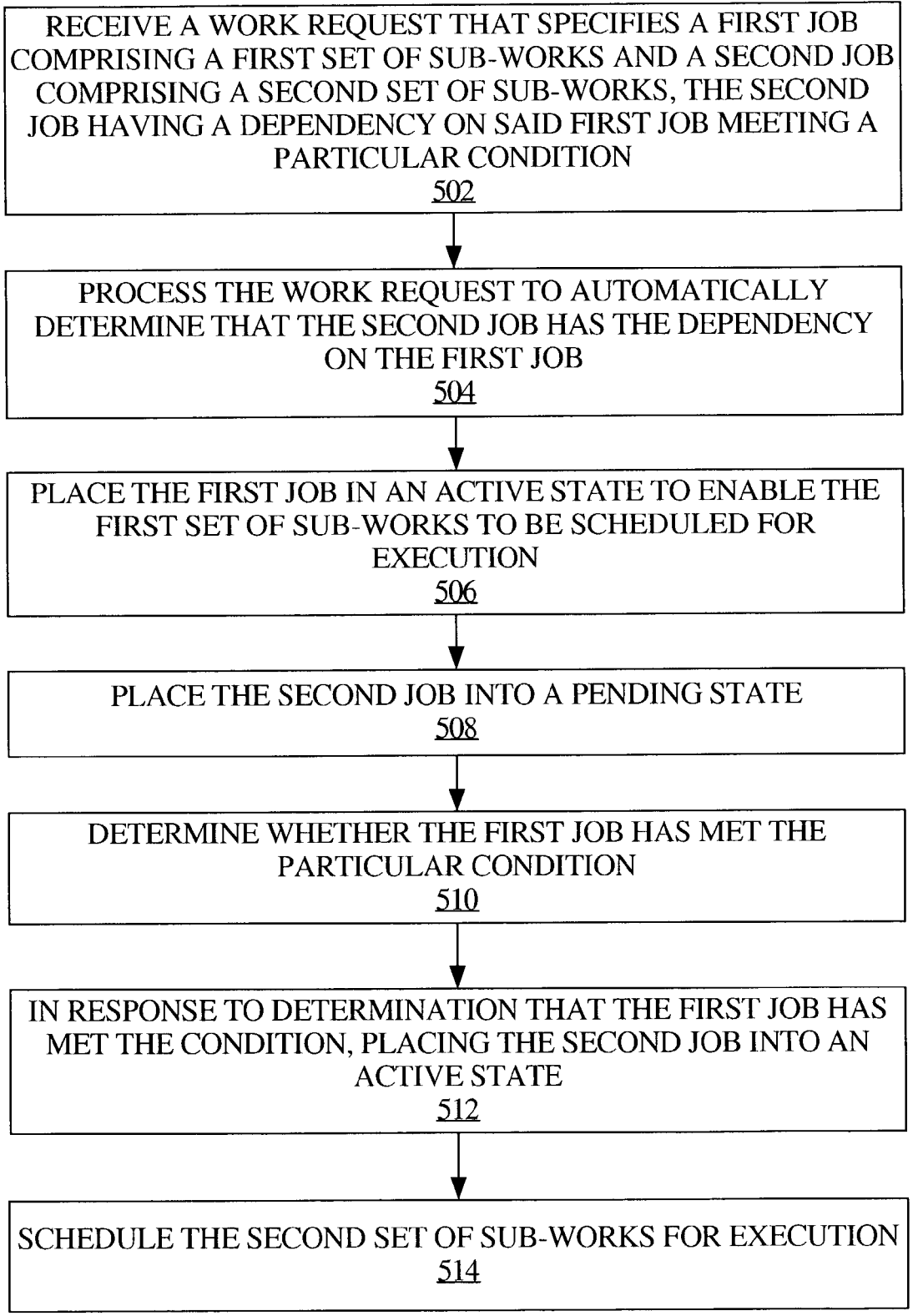
FIG. 5 is a flowchart illustrating a second process for managing execution of work.

FIG. 5 is a flowchart illustrating a second process for managing execution of work.

At block 502, a work request is received that specifies a first job comprising a first set of one or more sub-works and a second job comprising a second set of one or more sub-works. Further, the work request specifies that the second job has a dependency on the first job meeting a particular condition. For example, the second job may only execute if the first job finishes in a completed state 210 (FIG. 2). However, the dependency condition could also be that the first job finishes in a state of unsuccessful termination, such as error state 209 or killed state 211.

An example portion of a simplified work request embodied in an input file 102 (FIG. 1), as described in reference to block 502, is as follows:

FirstJob($ID)
&SubWork1.1($ID)
!Task1.1.1
!Task1.1.2
&SubWork1.2($ID)
!Task1.2.1
SecondJob($ID): FirstJob($ID)
&SubWork2.1($ID)
!Task2.1
&SubWork2.2($ID):SubWork2.1($ID)
!Task2.2.1 where SecondJob($ID): FirstJob($ID) specifies the dependency of the second job on the first job.

At block 504, the work request is processed to automatically determine that the second job has the dependency on the first job. For example, the work control and management layer 104 (FIG. 1) parses and interprets the entire input file 102 (FIG. 1) to determine the dependency between the first and second jobs. Furthermore, the work request is interpreted and processed to identify all other dependencies between other jobs that are constituent to the work request, in order to generate an execution sequence for the multiple jobs and tasks specified in the work request.

At block 506, the first job is placed in an active state 208 (FIG. 2), thus enabling its first set of sub-works to be scheduled for execution. Recall that sub-works of a given job cannot be scheduled for execution until the given job is in the active state 208. Hence, computing resources are not unnecessarily allocated to, or used for, sub-works before the sub-works are almost ready to execute. In other words, resources are allocated just in time for when they are actually needed, with respect to the overall execution scheme for the entire work execution process. Furthermore, holding sub-works that are task commands in a pending state 206 (FIG. 2) wastes job management and computing resources, including clogging DRM 106 (FIG. 1) queues.

In an embodiment, and according to the job states described in reference to FIG. 2, the first job is changed to the completed state 210 from the active state 208 upon the first set of sub-works, that is, the sub-works of the first job, finishing executing. Hence, a job is not complete until all of its sub-works are complete. In a related embodiment, prior to changing the first job to the completed state 210, an indication is received at the first job, from a first sub-work of the first job, that the first sub-work has finished executing. Therefore, the status of the sub-works of the first job other than the first sub-job are checked to determine whether the all of the sub-works of the first job have finished executing. If they have, then the first job is moved to the completed state 210. In another related embodiment, propagation of state is performed by the first job notifying its parent job that it is in the completed state 210, which can be propagated further up the aggregation hierarchy to the master job.

At block 508, the second job is placed in a pending state 206 (FIG. 2), where it remains until all of its dependencies are met. Note that the second job is not a task command, thus it does not unnecessarily waste job management and computing resources while in the pending state 206, as do task commands. At block 510, it is determined whether the first job has met the particular condition. In an embodiment, block 510 includes receiving at the second job, from the first job, an indication that the first job has met the particular condition. This process may be referred to as a data observer model, whereby a first entity registers with a second entity on which it depends, and passively observes or awaits for data from the second entity.

At block 512, in response to a determination that the first job has met the particular condition, thereby indicating the dependency between the first and second jobs has been met, the second job is now placed into an active state 208 (FIG. 2). Finally, at block 514, the second set of sub-works is now scheduled for execution, since its parent job, i.e., the second job, is in an active state because its dependencies have been met.

In an embodiment, the second set of sub-works has a parent-child relationship with the second job such that each sub-work in the second set of sub-works is a child of the second job, wherein, and significantly, the sub-works are not explicitly specified as having any dependency on the first job. In other words, sub-works that are aggregated under a given job inherit the dependencies of the given job, that is, they also depend on the same job on which their parent depends. Note that in the example portion of a work request presented above, SubWork1 of SecondJob does not explicitly specify a dependency on FirstJob, although its execution sequence is such that it does depend on the first job meeting the particular condition.

In one embodiment, and as depicted in the example portion of a work request, the second set of sub-works, i.e., the sub-works of SecondJob, includes a first sub-job (SubWork2.1) and a second sub-job (SubWork2.2), wherein the second sub-job includes an executable task command (Task2.2.1) and depends on the first sub-job (SubWork2.2($ID):SubWork2.1($ID)). A process for managing such specified work, similar to a portion of the process illustrated in FIG. 5, comprises determining whether the first sub-job has met its particular dependency condition, and in response to a positive determination thereto, placing the second sub-job into an active state. Next, the task command is caused to be executed.

The preceding embodiment illustrates that sub-works that are jobs can also have dependencies. The embodiment further illustrates that once dependencies of a sub-work having executable task commands are met, the task commands can be executed.

Another embodiment is illustrated in reference to the following portion of an example work request.

SecondJob($ID): FirstJob($ID)
  &SubWork2.1($ID)
   !Task2.1.1
  &SubWork2.2($ID)
   !Task2.2.1
    &SubWork2.2.1($ID):SubWork2.1($ID)

In this work request, the second set of sub-works, i.e., the sub-works of SecondJob, includes a first sub-job (SubWork2.1) and a second sub-job (SubWork2.2), wherein the second sub-job includes a third sub-job (SubWork2.2.1) that depends on the first sub-job (SubWork2.2.1($ID):SubWork2.1($ID)). A process for managing such specified work, similar to a portion of the process illustrated in FIG. 5, comprises determining whether the first sub-job has met its particular dependency condition, and in response to a positive determination thereto, placing the third sub-job into an active state.

The preceding embodiment illustrates that sub-works that are jobs can also have dependencies, and that such dependencies can be either on another sub-works at a different level of the aggregation hierarchy. Furthermore, a sub-work dependency can be on a job that is at a different level of the aggregation hierarchy.

In an embodiment, a sub-work from the first set of sub-works that is an executable task command is changed to a pending state 206 (FIG. 2) from a scheduled state 204 (FIG. 2) upon submission of the task command to a DRM system, such as DRM application 106 (FIG. 1). Furthermore, the task command is maintained in the pending state 206 until the DRM system causes the command to begin execution by distributing the task, such as a task server 806 (FIG. 8), to a processor, such as a processor of server farm 108. The clocking of a task's state within the work management process, in coordination with the task's interaction with a distributed resource management application, is embodied in this process.

Figure 6:
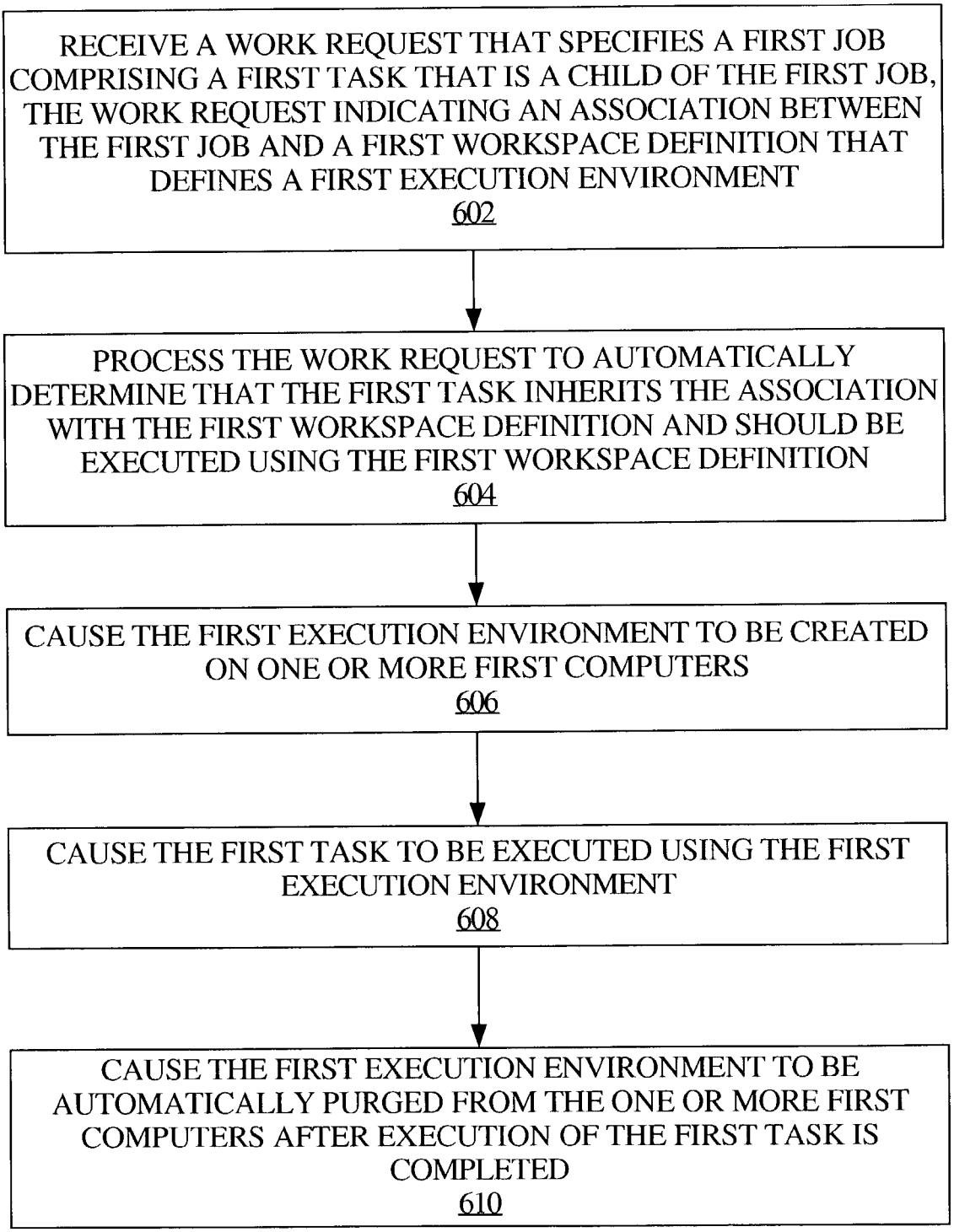
FIG. 6 is a flowchart illustrating a third process for managing execution of work.

FIG. 6 is a flowchart illustrating a third process for managing execution of work.

At block 602, a work request is received that specifies a first job comprising a first task that is a child of the first job. Further, the work request indicates an association between the first job and a workspace definition that defines a first execution environment. Still further, the work request has no explicit directive to execute the first task using the first execution environment. The concept of workspaces and workspace definitions are described above under the heading "Workspaces".

At block 604, the work request is processed to automatically determine that the first task inherits the association with the first workspace definition, as a result of the first task being a child of the first job. Hence, the first task should be executed using the first execution environment.

At block 606, the process causes the first execution environment to be created on one or more first computers, and at block 608, causes the first task to be executed using the first execution environment. In various embodiments, causing creation of the first execution environment can cause software applications to be installed, such as a distributed resource management application; cause directories to be created for storage of information associated with execution of the first task; populate directories with data files; cause sets of data to be stored; and cause configuration parameters to be set, for example, for software or hardware configurations.

The set of resources that comprise an execution environment can be configured on a single computer or on multiple computers, for example, on multiple servers of a server farm 108 (FIG. 1). Furthermore, in an embodiment, creation of a workspace is implemented using task commands. Thus, workspace task commands function similar to other task commands, as described above under the heading "Tasks". Therefore, an execution environment is not reliant on its creation on a given computing platform, rather, it can be configured on any computing platform running any number of operating systems (e.g., Windows, Unix, Linux, etc.) and still be utilized by task commands executing on different networked computers. That is, a set of resources associated with an execution environment are configured such that the resources are available and accessible to two or more servers of a server farm, without having to configure duplicate sets of resources on each server.

According to an embodiment, at block 610 the first execution environment is caused to be automatically purged, deleted, or deconfigured from the one or more first computers after execution of the first task is completed. Therefore, computing resources that were being used for the execution environment are made available for other uses.

In an embodiment, the workspace definition includes a reference to an object class that includes functionality that can be invoked to create the associated execution environment. In a related embodiment, the object class is persistently stored in a database, such as database 110 (FIG. 1). Hence, a set of resources configured for the execution environment can be reconfigured after a failure of a computer on which the environment was configured, without again processing the work request, as at block 604.

Hierarchical Logging

The job aggregation structure defined in a work request, i.e., through one or more JR files, is further utilized for status reporting. In this context, status reporting refers to presenting job log information. The structure of the job log information mirrors the job aggregation structure defined in a given work request. The presentation of job log information according to the job aggregation structure is referred to as hierarchical logging.

As part of the persistent object model, hierarchical logging overcomes challenges associated with running multiple jobs in multiple locations or on multiple computing platforms. In contrast to prior approaches to logging job execution information in the context of server farms, which typically interleave or concatenate multiple log files from multiple jobs and store a mass of information in a single file or directory, hierarchical logging stores job log information in multiple hierarchically-related entities, in the database.

Since the state of tasks and jobs propagate up the job aggregation hierarchy to the master job, a state associated with any job or task at any level is presented through a user interface. For example, various states can be presented in a color-coded manner. Consequently, a user can quickly and easily determine what branch of the job aggregation structure had a job or jobs that terminated with a particular state of interest, such as an error state.

In one embodiment, logging information is presented in a manner that allows a user to traverse any given branch of the job aggregation structure to "drill down" through the structure to a job of interest through the use of hyperlinks. For example, a job 5 may have terminated in an error state, thus, its ancestor jobs, i.e., parent job 4, grandparent job 3, and master job 1, are all presented in a manner indicative of an error state. A user can view the state of the master job 1 to determine that there is an error somewhere in master job 1. Interacting with the master job 1 link (e.g., clicking on the link with a pointer such as a mouse) causes the state of master job 1's children to be displayed, which would indicate that job 3 is in the error state. Continuing to drill down through the levels of the hierarchy by following the hyperlinks from job to job, results in the ability to determine that it is job 5 which actually terminated in the error state. One can then view the log information associated with job 5 to aid in debugging the error. Traversing the hierarchical job aggregation structure through the use of hyperlinks provides the ability to quickly and easily identify jobs with particular termination states, without having to parse and manually search through thousands of lines of log information in an attempt to discover the actual job in the particular termination state that triggered the propagation of such state up through the presentation of the hierarchical log.

One significant aspect of hierarchical logging is that task log information is stored in its associated job object. Furthermore, each job object has its own directory structure, which is typically a hierarchical structure. Thus, data can be concurrently streamed into and read from a given object. Consequently, a user can drill down to a given job from the master job, and can view the log information in real-time, essentially as it is being transmitted to the job object. Hence, the progress of a job can be monitored in real-time, errors can be recognized quickly and potentially fixed and the job restarted, without having to wait for the entire master job to finish. Another benefit of storing and presenting log information hierarchically and in real-time is that a "percentage complete" can be displayed at various levels of an aggregated job process.

Hierarchical logging is provided by establishing a file directory, by the work control and management layer 104 (FIG. 1), based on the job aggregation structure defined in a work request. Operationally, a task server (see task server 806 of FIG. 8) inquires of its associated job server (see job server 804 of FIG. 8) as to where to store log information for its executable task command that is being executed on the server farm 108 (FIG. 1). Each executable task command has an associated log file to which it stores its respective log information. The log files are organized and related based on the file directory interpreted from the work request. Hence, hierarchical logging benefits from a pre-processed organized storage structure, therefore not requiring post-processing to organize the log information into the hierarchical structure. An additional benefit provided by this feature is that reclamation of resources is made simpler. For example, it is simple to delete a branch or the entire tree of the log structure to free up resources, due to the nature of the hierarchical log structure.

Figure 7:
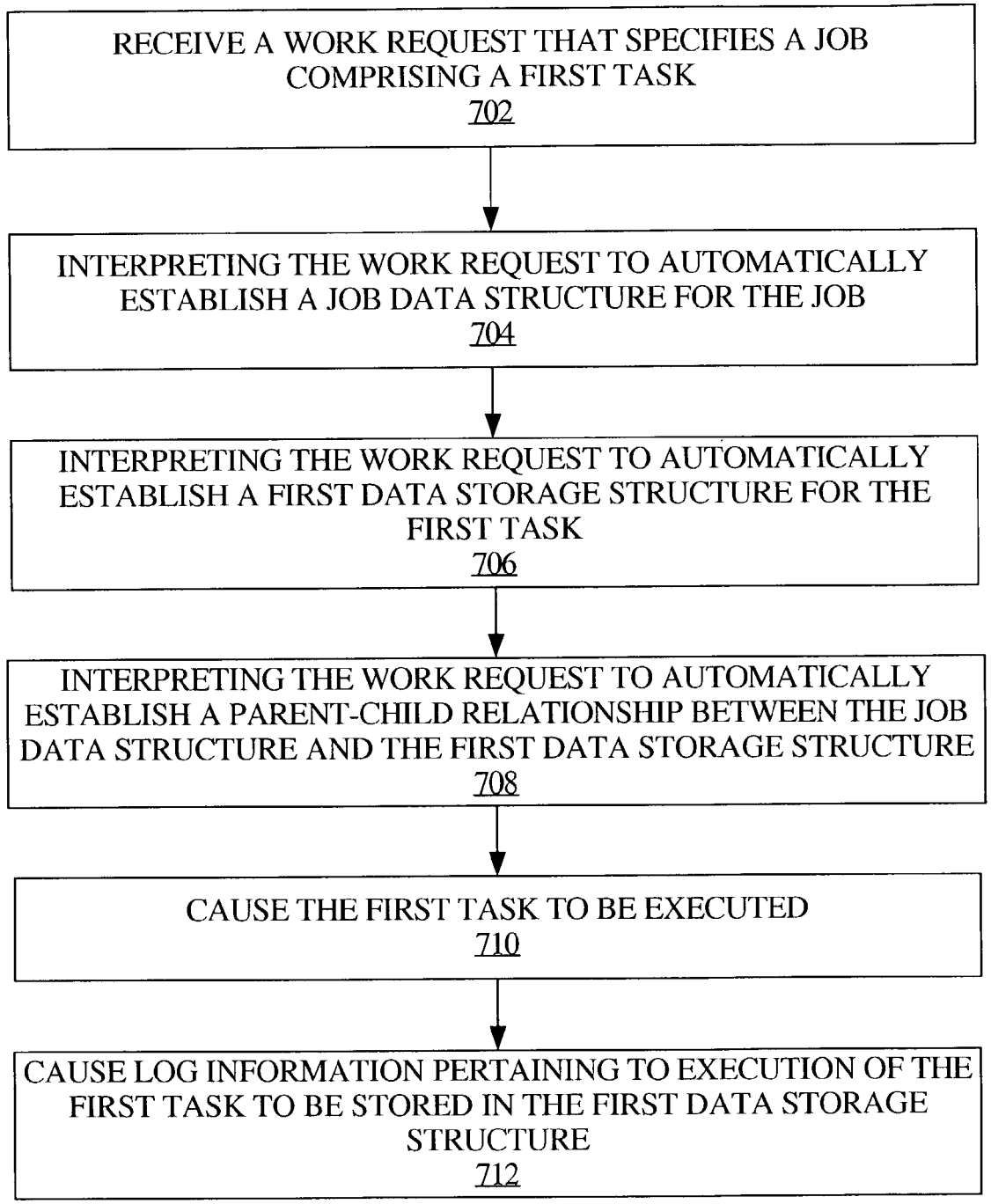
FIG. 7 is a flowchart illustrating a process for processing a work request.

FIG. 7 is a flowchart illustrating a process for processing a work request.

At block 702, a work request is received that specifies a job comprising a first task. At block 704, the work request is interpreted and processed to automatically establish a job data structure for the job. For example, an object tree is created which represents a job data structure for a given job, with each object representing a sub-job or task associated with the given job. Further, in an embodiment, a hierarchical directory is established which represents the job aggregation structure specified for the job in the work request. At block 706, the work request is interpreted to automatically establish a first data storage structure for the first task. For example, an object within the object tree or a file or folder within the hierarchical job directory is established in association with a given task.

As previously described, the work control and management layer 104 (FIG. 1) is capable of processing input files 102 (FIG. 1), such as JR language files, to interpret the relationships between jobs and tasks that make up the work, which are inherently specified within the work request input files 102. As such, and according to embodiments, the work request does not include an executable command to establish the job data structure or the data storage structure.

At block 708, the work request is further processed to interpret and automatically establish a parent-child relationship between the job data structure and the first data storage structure. The parent-child relationship, in this context, is sometimes referred to as an ownership relationship, in which the job data structure owns the first data storage structure. Ownership entails a relationship which functions such that if and when the job data structure is deleted, the first data storage structure is resultantly deleted. Thus, in an embodiment, upon receiving a request to delete the job data structure, both the job data structure and the first data storage structure are deleted.

At block 710, the first task is caused to be executed. For example, a task server 806 (FIG. 8) is passed to a distributed resource management application 104 (FIG. 1) for distribution to one or more servers of server farm 108 (FIG. 1). At block 712, log information pertaining to execution of the first task is caused to be stored in the first data storage structure. However, in an embodiment, the work request does not include an executable command to store the log information in the first data storage structure. Again, the work control and management layer 104 (FIG. 1) is capable of processing input files 102 (FIG. 1), such as JR language files, to interpret the relationships between jobs and tasks that make up the work, which are inherently specified within the work request input files 102. The structure of a work request, when interpreted and processed by an application layer with the capabilities of a work control and management layer 104, implicitly indicates that log information associated with particular tasks are stored in respective associated data storage structures. Further, according to an embodiment, the first data storage structure does not include log information pertaining to any task other than the first task.

In an embodiment, upon receiving a request to view log information pertaining to execution of the first task, the first data storage structure is accessed and the log information stored therein is rendered. Furthermore, the log information can be rendered while the log information stored in the first data storage structure is being updated, i.e., changing.

According to an embodiment, a job representation of the relationship between the job data structure and the first data storage structure is rendered. For example, a user interface at workstation 101 (FIG. 1) displays information identifying the job associated with the job data structure, and displays information identifying the task associated with the first data storage structure, in such a way as to portray their parent-child relationship. For example, jobs, sub-jobs and tasks for a given unit of work are displayed in an indented or other outline format, thus representing the hierarchical relationships therebetween. Furthermore, the representation includes a hyperlink or similar linking mechanism from the job representation to a task representation associated with the first data storage. Implementations include rendering all levels of the hierarchy on a single view, within the constraints of the workstation screen size, etc., and rendering only two levels of the hierarchy at a time.

In response to receiving a request to view the log information pertaining to the first task, which request was submitted via the hyperlink, the first data storage structure is accessed the log information stored therein is rendered as the task representation. As described above, job and task representations can be color coded to indicate termination status, for example, whether a task completed successfully or with an error, warning, etc. Furthermore, the completion status is propagated up the hierarchy to the master job. Significantly, a user can "drill down" through the work and job aggregation hierarchy, as represented and rendered on the display, using a pointing device to enact the hyperlinks. Hence, the user can quickly and easily find and view the log information for a task that finished executing in a certain state (see FIG. 2).

As described above, a job can have multiple sub-jobs and multiple tasks. Hence, a different data storage structure is established for each sub-job and task, which are associated with the parent job or sub-job data structure. Log information pertaining to execution of respective tasks, and only the respective task, is stored in respective data storage structures. Furthermore, in response to a request to delete a job data structure, all of the progeny sub-jobs and tasks of that job are deleted.

In an embodiment, a work request specifies a job with at least two constituent tasks, each with a distinct data storage structure with a respective status. In order to derive a status for the job, the respective statuses for the respective tasks are processed. As such, the statuses of tasks are propagated up the job aggregation hierarchy, as described above.

Work Control and Management Layer

Figure 8:
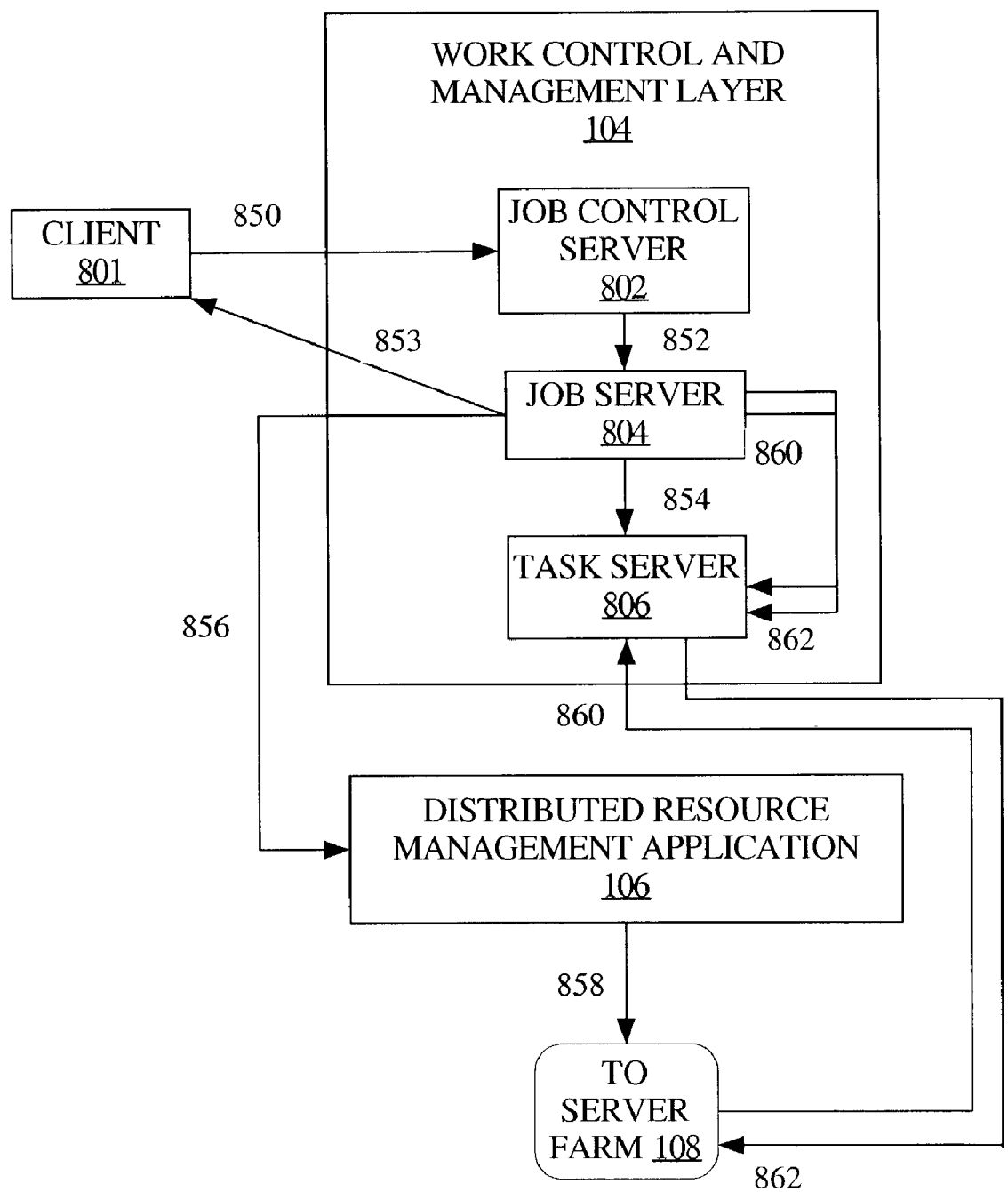
FIG. 8 is a block diagram illustrating an operating configuration of a work control and management layer.

FIG. 8 is a block diagram illustrating an operating configuration of the work control and management layer 104 (FIG. 1). A client-side application at client 801 is used to submit jobs to the work control and management layer 104. More specifically, jobs are submitted to the management layer 104 via a job control server 802, depicted as process 850. For example, jobs may be submitted through a work request embodied in one or more input files 102 (FIG. 1), such as a JR file. Multiple work requests can concurrently be submitted to job control server 802.

The management layer 104 includes, at certain times during processing of the work defined in a work request, a job server 804 and a plurality of task servers 806. Servers 802, 804, 806 are software applications or processes executing on one or more machines. When a work request is received at job control server 802, the job control server 802 initiates a job server 804, depicted as process 852.

A job server 804 is essentially a process initiated for each separate work request received by job control server 802. Once a job server 804 is instantiated for a work request, the job server 802 passes a job ID back to the client 801 for reference, depicted as process 853.

In one embodiment, the job ID has a hierarchical configuration resembling a pathname, wherein each level of the job ID corresponds to a level of a hierarchy. The hierarchy embodied in the job ID mirrors the job aggregation hierarchy specified in the work request. For example, a job ID can be configured as: group.usernamejobnumber.sub-job. Thus, components of the job ID reference a process specified in a corresponding work request. Furthermore, successive runs of a job are incrementally identified. Incrementally identifying successive runs of a job facilitates statistical analysis of successive corresponding job runs. The job ID structure also drives the structure, described above, of the log report information presented to a user.

Job server 804 is responsible for parsing the work request submitted by client 801 and creating a corresponding object tree that embodies the process flow between objects representing, for example without limitation, jobs, tasks, workspace definitions, utilities and the like. Furthermore, the objects are made to be persistent, whereby their state is maintained at all times during their processing, typically in a database such as database 110 (FIG. 1). Objects are also made to be distributable so that they are accessible to different processes within the work execution flow. Implementation of a conventional distributed object model architecture, such as CORBA, is sufficient for the latter function.

When the job server 804 encounters an executable task command in an input file 102 (FIG. 1) embodying a work request, the job server 804 passes a command to a distributed resource management application 106, essentially requesting the application 106 find a processor on a server farm 108 (FIG. 1) on which to execute the task command, as depicted as process 856. The command passed to the management application 106 requests submission of a task server 806, which represents one or multiple grouped tasks, to the server farm 108 (FIG. 1). Each task server 806 consists of the same _exectasks command, along with a job ID.

The management application 106 serves a dispatching function by submitting a task server 806 to a processor on the server farm 108, depicted as process 858. Submission of the task server 806 causes communication back to the job server 804 via the task server 806, depicted as process 860. The task server 806 includes a pointer back to a proxy at the job server 804, which points to the real object on the job server 804. Thus, process 860 essentially asks the job server 804 what to do to execute the task commands associated with the job ID submitted with the _exectasks command, i.e., task server 806. Task server 806 objects are instantiated during the process 860 when the _exectasks command begins to run, by establishing a connection to the job server 804, i.e., the job object identified by the job ID.

Process 862 essentially extracts the information that the server farm 108 needs to perform a portion of work embodied in one or more tasks from the job server 804. For example, process 862 extracts the actual executable command or commands associated with the task and the workspace configuration commands. In turn, according to one embodiment, a task server 806 can propagate statistics that are maintained by the task server 806, back to the associated job server 804 to be propagated through the job aggregation structure, ultimately to the master job. Process 862 is generally in response to the request process 860. Once the server farm 108 has the task server information that it needs, it executes the task commands on one or more processors of the server farm.

According to one embodiment, in which a work request includes a sequential set of executable task commands, process 856 passes the sequential set of task commands to the distributed resource management application 106 (FIG. 1) as a single job. Hence, as previously described, the sequential tasks are run in sequence, but the overhead associated with submission of the job by the application 106 to the server farm 108 (FIG. 1) is reduced in comparison with submission of the tasks separately.

In one aspect, the work control and management layer 104 comprises an automatic optimization feature, through which the management layer 104 generates a proposed JR file that embodies a work request that was previously encountered and run. Based on statistics generated from a previous work run, the management layer 104 restructures the work definition, that is, the aggregation of jobs and dependencies between jobs, into a proposed work request. The proposed work request can then be presented to the user for review and implementation, if desired.

Implementation Mechanism-Hardware Overview

Figure 9:
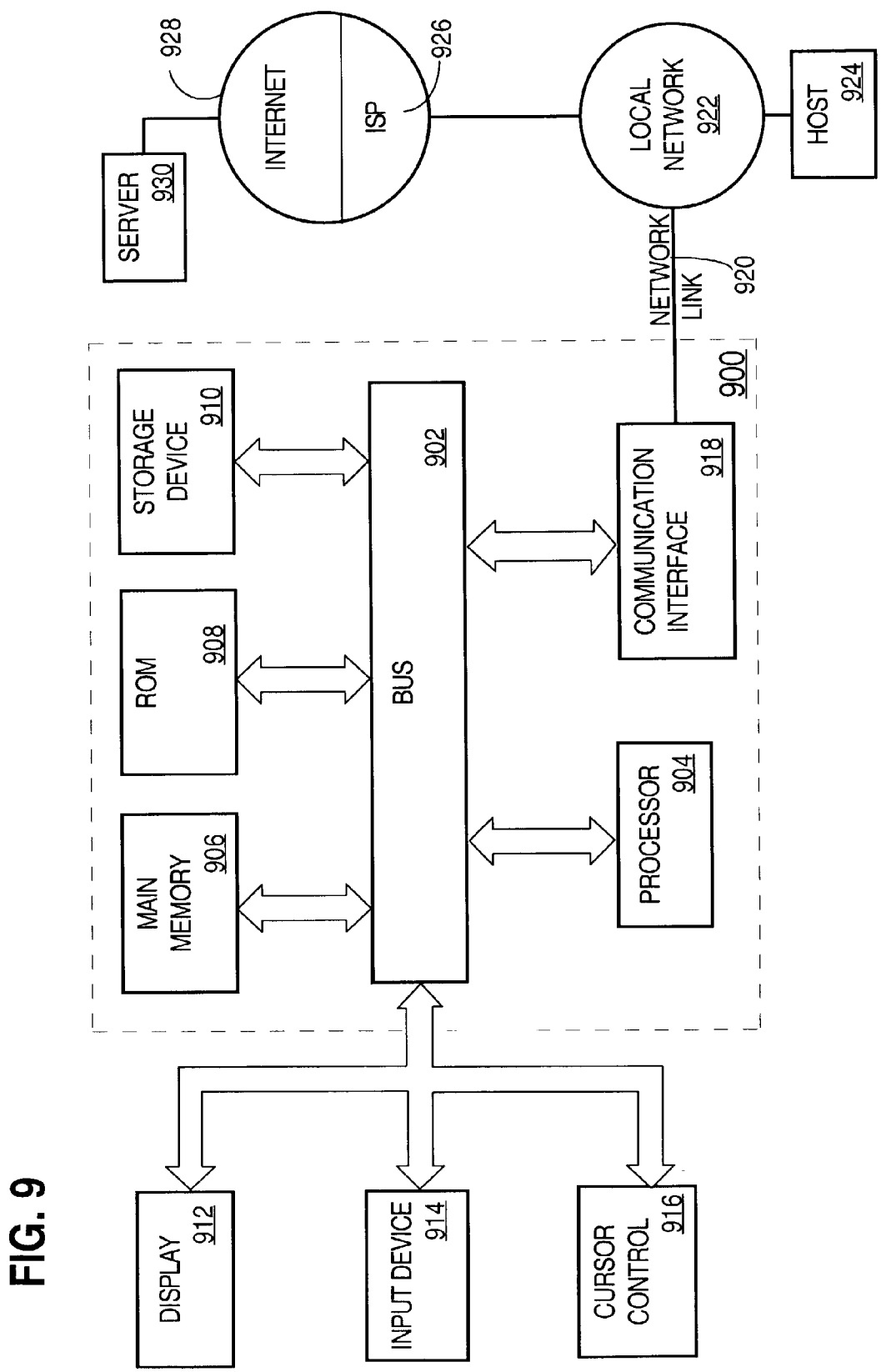
FIG. 9 is a block diagram that illustrates a computer system 900 upon which embodiments of the invention may be implemented.

FIG. 9 is a block diagram that illustrates a computer system 900 upon which embodiments of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for managing execution of work processes. According to one embodiment of the invention, management and control of processes in a networked multi-processor computing environment is provided by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. One or more processors in a multi-processing arrangement may also be employed to execute the sequences of instructions contained in main memory 906. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector coupled to bus 902 can receive the data carried in the infrared signal and place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application provides for management and control of processes in a networked multi-processor computing environment, as described herein.

The received code may be executed by processor 904 as it is received, and/or stored in storage device 910, or other non-volatile storage for later execution. In this manner, computer system 900 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A computer implemented method for managing execution of work in a networked multi-processor computing environment in which work is distributed between multiple processors, the method comprising:

receiving a first file that represents a work request, said first file specifying a first job and a second job for execution in a networked multi-processor computing environment in which work is distributed among multiple processors, said first job comprising a first task and said second job comprising a second task;

wherein said first task has a parent-child relationship with said first job such that said first task is a child of said first job, and wherein said second task has a parent-child relationship with said second job such that said second task is a child of said second job;

wherein said first and second jobs comprise respective aggregations of executable commands and wherein said first and second tasks each comprise at least one of said executable commands;

wherein dependencies among jobs are specified in a corresponding work request by hierarchically relating, in a file that represents the corresponding work request, interdependent jobs, and wherein dependencies among jobs specified in the corresponding work request contribute to a determination of an order in which commands are executed in the networked multi-processor computing environment;

interpreting said first file to automatically determine, based at least in part on whether said first and second jobs are hierarchically related in the first file, whether said first and second jobs have any dependencies that have not been satisfied;

in response to a determination that said first and second jobs have no dependencies that have not been satisfied, causing said first task of said first job and said second task of said second job to be executed in parallel based on a default work execution order which is to execute jobs in parallel unless otherwise specified in said file that represents said work request; and wherein said work request does not explicitly specify that said first and second tasks be executed in parallel.

2. The method of claim 1, wherein causing includes:
placing both said first and second jobs into an active state;
after said first job is placed into an active state, causing said first task to be executed; and
after said second job is placed into an active state, causing said second task to be executed.

3. The method of claim 1, wherein said first job further comprises a third task, and wherein said method further comprises:
after execution of said first task has finished, causing said third task to be executed.

4. The method of claim 3, wherein said first and third tasks have a parent-child relationship with said first job such that said first task is a child of said first job and said third task is also a child of said first job.

5. The method of claim 1, wherein said networked multi-processor computing environment comprises a server farm, and wherein causing includes:
providing said first and second tasks to a distributed resource management application to enable said resource management application to distribute said first and second tasks to one or more servers in said server farm to execute said first and second tasks in parallel.

6. The method of claim 1, wherein said networked multi-processor computing environment comprises a server farm, and wherein causing includes:
distributing said first and second tasks to one or more servers in said server farm to execute said first and second tasks in parallel.

7. The method of claim 1,
wherein said first job further comprises a first sub-job that includes a fourth task;
wherein said first file specifies, via a hierarchical relationship, that said first sub-job has a parent-child relationship with said first job such that said first sub-job is a child of said first job;
wherein said first file specifies, via a hierarchical relationship, that said fourth task has a parent-child relationship with said first sub-job such that said fourth task is a child of said first sub-job;
and said method further comprises:
based at least in part on how said first task and said fourth task are hierarchically related in the first file, causing said first task and said fourth task to be executed in parallel.

8. The method of claim 7, wherein said first job further comprises a second sub-job that includes a fifth task;
wherein said first file specifies, via a hierarchical relationship, that said second sub-job has a parent-child relationship with said first job such that said second sub-job is a child of said first job;
wherein said first file specifies, via a hierarchical relationship, that said fifth task has a parent-child relationship with said second sub-job such that said fifth task is a child of said second sub-job;
and said method further comprises:
based at least in part on how said first task, said fourth task, and said fifth task are hierarchically related in the first file, causing said first task, said fourth task, and said fifth task to be executed in parallel.

9. The method of claim 1, wherein processing includes processing a sequential set of two or more tasks, and said method further comprises:

causing said sequential set of tasks to be executed as a job, wherein said sequential set of tasks are provided to a resource manager to enable said resource manager to distribute for execution, with a single submission to a group of servers, said two or more tasks to one or more servers in said group of servers.

10. A computer-readable storage medium carrying one or more sequences of instructions for managing execution of work in a networked multi-processor computing environment in which work is distributed between multiple processors, wherein execution of the one or more sequences of instructions by one or more processors causes the one or more processors to perform:

receiving a first file that represents a work request, said first file specifying a first job and a second job for execution in a networked multi-processor computing environment in which work is distributed among multiple processors, said first job comprising a first task and said second job comprising a second task;

wherein said first task has a parent-child relationship with said first job such that said first task is a child of said first job, and wherein said second task has a parent-child relationship with said second job such that said second task is a child of said second job;

wherein said first and second jobs comprise respective aggregations of executable commands and wherein said first and second tasks each comprise at least one of said executable commands;

wherein dependencies among jobs are specified in a corresponding work request by hierarchically relating, in a file that represents the corresponding work request, interdependent jobs, and wherein dependencies among jobs specified in the corresponding work request contribute to a determination of an order in which commands are executed in the networked multi-processor computing environment;

interpreting said first file to automatically determine, based at least in part on whether said first and second jobs are hierarchically related in the first file, whether said first and second jobs have any dependencies that have not been satisfied;

in response to a determination that said first and second jobs have no dependencies that have not been satisfied, causing said first task of said first job and said second task of said second job to be executed in parallel based on a default work execution order which is to execute jobs in parallel unless otherwise specified in said file that represents said work request; and wherein said work request does not explicitly specify that said first and second tasks be executed in parallel.

11. The computer-readable storage medium of claim 10, wherein execution of the one or more sequences of instructions by one or more processors causes the one or more processors to perform the causing by performing:

placing both said first and second jobs into an active state;

after said first job is placed into an active state, causing said first task to be executed; and after said second job is placed into an active state, causing said second task to be executed.

12. The computer-readable storage medium of claim 10, wherein said first job further comprises a third task, and wherein execution of the one or more sequences of instructions by one or more processors causes the one or more processors to perform:

after execution of said first task has finished, causing said third task to be executed.

13. The computer-readable storage medium of claim 12, wherein said first and third tasks have a parent-child relationship with said first job such that said first task is a child of said first job and said third task is also a child of said first job.

14. The computer-readable storage medium of claim 10, wherein said networked multi-processor computing environment comprises a server farm, and wherein execution of the one or more sequences of instructions by one or more processors causes the one or more processors to perform the causing by performing:

providing said first and second tasks to a distributed resource management application to enable said resource management application to distribute said first and second tasks to one or more servers in said server farm to execute said first and second tasks in parallel.

15. The computer-readable storage medium of claim 10, wherein said networked multi-processor computing environment comprises a server farm, and wherein execution of the one or more sequences of instructions by one or more processors causes the one or more processors to perform the causing by performing:

distributing said first and second tasks to one or more servers in said server farm to execute said first and second tasks in parallel.

16. The computer-readable storage medium of claim 10, wherein said first job further comprises a first sub-job that includes a fourth task;

wherein said first file specifies, via a hierarchical relationship, that said first sub-job has a parent-child relationship with said first job such that said first sub-job is a child of said first job;

wherein said first file specifies, via a hierarchical relationship, that said fourth task has a parent-child relationship with said first sub-job such that said fourth task is a child of said first sub-job; and wherein execution of the one or more sequences of instructions by one or more processors causes the one or more processors to perform:

based at least in part on how said first task and said fourth task are hierarchically related in the first file, causing said first task and said fourth task to be executed in parallel.

17. The computer-readable storage medium of claim 16, wherein said first job further comprises a second sub-job that includes a fifth task;

wherein said first file specifies, via a hierarchical relationship, that said second sub-job has a parent-child relationship with said first job such that said second sub-job is a child of said first job;

wherein said first file specifies, via a hierarchical relationship, that said fifth task has a parent-child relationship with said second sub-job such that said fifth task is a child of said second sub-job; and wherein execution of the one or more sequences of instructions by one or more processors causes the one or more processors to perform:

based at least in part on how said first task, said fourth task, and said fifth task are hierarchically related in the first file, causing said first task, said fourth task, and said fifth task to be executed in parallel.

18. The computer-readable storage medium of claim 10, wherein execution of the one or more sequences of instructions by one or more processors causes the one or more processors to perform the processing by processing a sequential set of two or more tasks, and wherein execution of the one or more sequences of instructions by one or more processors causes the one or more processors to perform:

causing said sequential set of tasks to be executed as a job, wherein said sequential set of tasks are provided to a resource manager to enable said resource manager to distribute for execution, with a single submission to a group of servers, said two or more tasks to one or more servers in said group of servers.

19. A network device that can manage execution of work, the network device comprising:

a network interface;

a processor coupled to the network interface and receiving network messages from the network through the network interface;

a computer-readable storage medium comprising one or more stored sequences of instructions which, when executed by the processor, cause performance of:

receiving a first file that represents a work request, said first file specifying a first job and a second job for execution in a networked multi-processor computing environment in which work is distributed among multiple processors, said first job comprising a first task and said second job comprising a second task;

wherein said first task has a parent-child relationship with said first job such that said first task is a child of said first job, and wherein said second task has a parent-child relationship with said second job such that said second task is a child of said second job;

wherein said first and second jobs comprise respective aggregations of executable commands and wherein said first and second tasks each comprise at least one of said executable commands;

wherein dependencies among jobs are specified in a corresponding work request by hierarchically relating, in a file that represents the corresponding work request, interdependent jobs, and wherein dependencies among jobs specified in the corresponding work request contribute to a determination of an order in which commands are executed in the networked multi-processor computing environment;

interpreting said first file to automatically determine, based at least in part on whether said first and second jobs are hierarchically related in the first file, whether said first and second jobs have any dependencies that have not been satisfied;

in response to a determination that said first and second jobs have no dependencies that have not been satisfied, causing said first task of said first job and said second task of said second job to be executed in parallel based on a default work execution order which is to execute jobs in parallel unless otherwise specified in said file that represents said work request; and wherein said work request does not explicitly specify that said first and second tasks be executed in parallel.

* * * * *